US012578470B1

(12) United States Patent
Varshney et al.

(10) Patent No.: US 12,578,470 B1
(45) Date of Patent: Mar. 17, 2026

(54) PACKAGE SORTATION AUTOMATION USING LIDAR SENSORS

(71) Applicant: Amazon Technologies, Inc., Seattle, WA (US)

(72) Inventors: Aayush Varshney, Gurugram (IN); Shashank Kumar, Benares (IN); Rahul Midha, New Delhi (IN); Gaurav Kumar, Bellevue, WA (US); Xin Liu, Sammamish, WA (US); Katrin Korten, Contern (LU); Rajesh Ramanathan, London (GB); Christopher Michael Delvizis, Brentwood, TN (US)

(73) Assignee: Amazon Technologies, Inc., Seattle, WA (US)

( * ) Notice: Subject to any disclaimer, the term of this patent is extended or adjusted under 35 U.S.C. 154(b) by 1031 days.

(21) Appl. No.: 17/701,116

(22) Filed: Mar. 22, 2022

(51) Int. Cl.
| | |
|---|---|
| *G01S 17/88* | (2006.01) |
| *B07C 3/00* | (2006.01) |
| *G01S 7/481* | (2006.01) |
| *G01S 17/06* | (2006.01) |
| *G06Q 10/08* | (2024.01) |

(52) U.S. Cl.
CPC .............. *G01S 17/88* (2013.01); *B07C 3/008* (2013.01); *G01S 7/4817* (2013.01); *G01S 17/06* (2013.01); *G06Q 10/08* (2013.01)

(58) Field of Classification Search
CPC ........ G01S 17/88; G01S 17/06; G01S 7/4817; G06Q 10/08; B07C 3/008
USPC ........................................................ 356/4.01
See application file for complete search history.

(56) References Cited

U.S. PATENT DOCUMENTS

| | | | | |
|---|---|---|---|---|
| 10,894,664 | B1 * | 1/2021 | Brady .................. | G05D 1/0088 |
| 10,988,313 | B2 * | 4/2021 | Phan-Quiroga ...... | B65G 1/1378 |
| 11,577,858 | B2 * | 2/2023 | Cottle .................. | B65G 43/08 |

* cited by examiner

*Primary Examiner* — Daniel L Murphy

(74) *Attorney, Agent, or Firm* — Eversheds Sutherland (US) LLP

(57) ABSTRACT

A compartment within a sortation area associated with sorting a package for shipment is determined. One or more lighting elements associated with the compartment are activated to a first state. Data associated with the package being sorted within the sortation area is generated by one or more LiDAR sensors. Using the data, a position within the sortation area corresponding to the package being sorted is determined. The one or more lighting elements associated with the compartment are activated to a second state that is different than the first state based on the position.

20 Claims, 10 Drawing Sheets

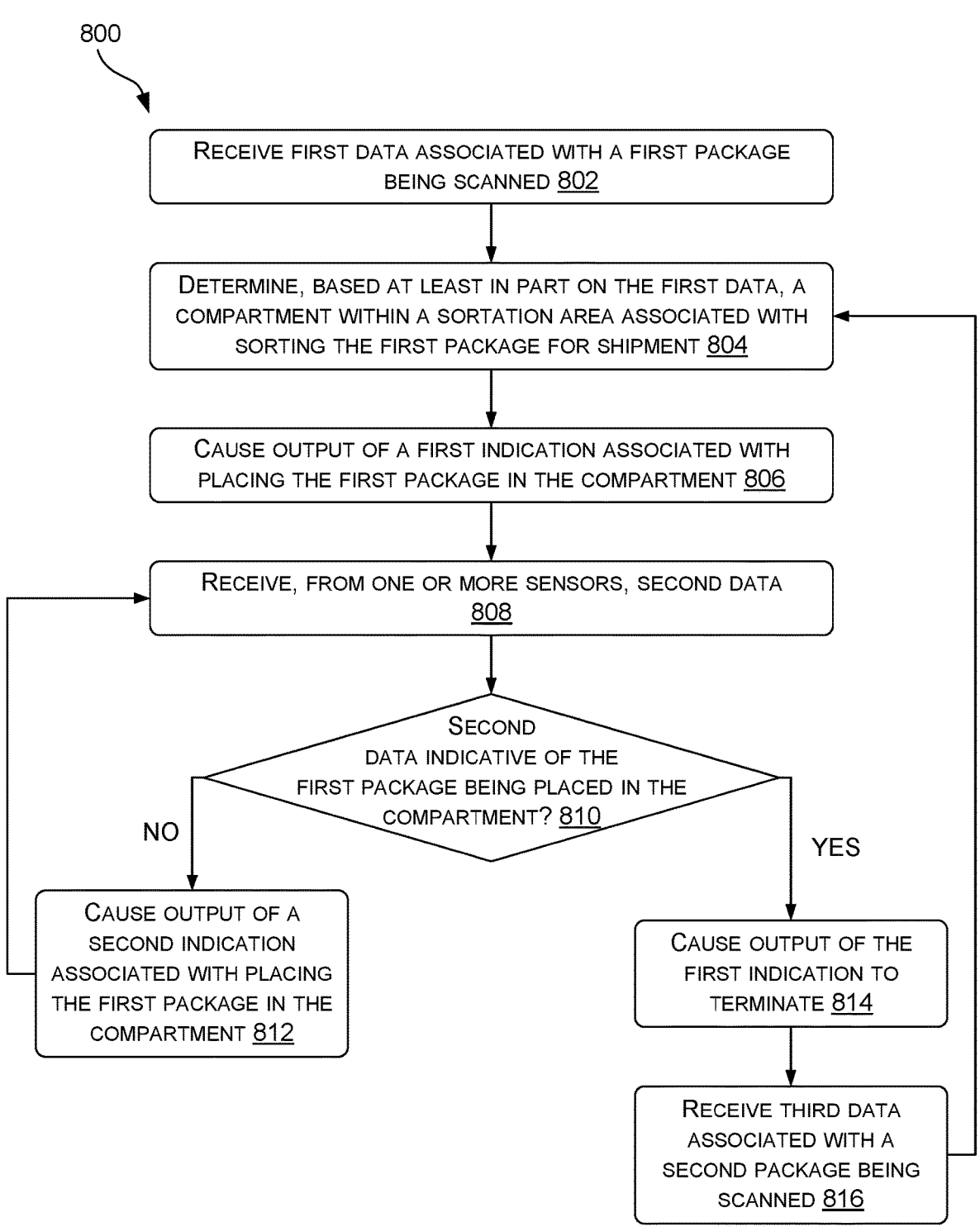

800

RECEIVE FIRST DATA ASSOCIATED WITH A FIRST PACKAGE BEING SCANNED 802

DETERMINE, BASED AT LEAST IN PART ON THE FIRST DATA, A COMPARTMENT WITHIN A SORTATION AREA ASSOCIATED WITH SORTING THE FIRST PACKAGE FOR SHIPMENT 804

CAUSE OUTPUT OF A FIRST INDICATION ASSOCIATED WITH PLACING THE FIRST PACKAGE IN THE COMPARTMENT 806

RECEIVE, FROM ONE OR MORE SENSORS, SECOND DATA 808

SECOND DATA INDICATIVE OF THE FIRST PACKAGE BEING PLACED IN THE COMPARTMENT? 810

NO

YES

CAUSE OUTPUT OF A SECOND INDICATION ASSOCIATED WITH PLACING THE FIRST PACKAGE IN THE COMPARTMENT 812

CAUSE OUTPUT OF THE FIRST INDICATION TO TERMINATE 814

RECEIVE THIRD DATA ASSOCIATED WITH A SECOND PACKAGE BEING SCANNED 816

FIG. 8

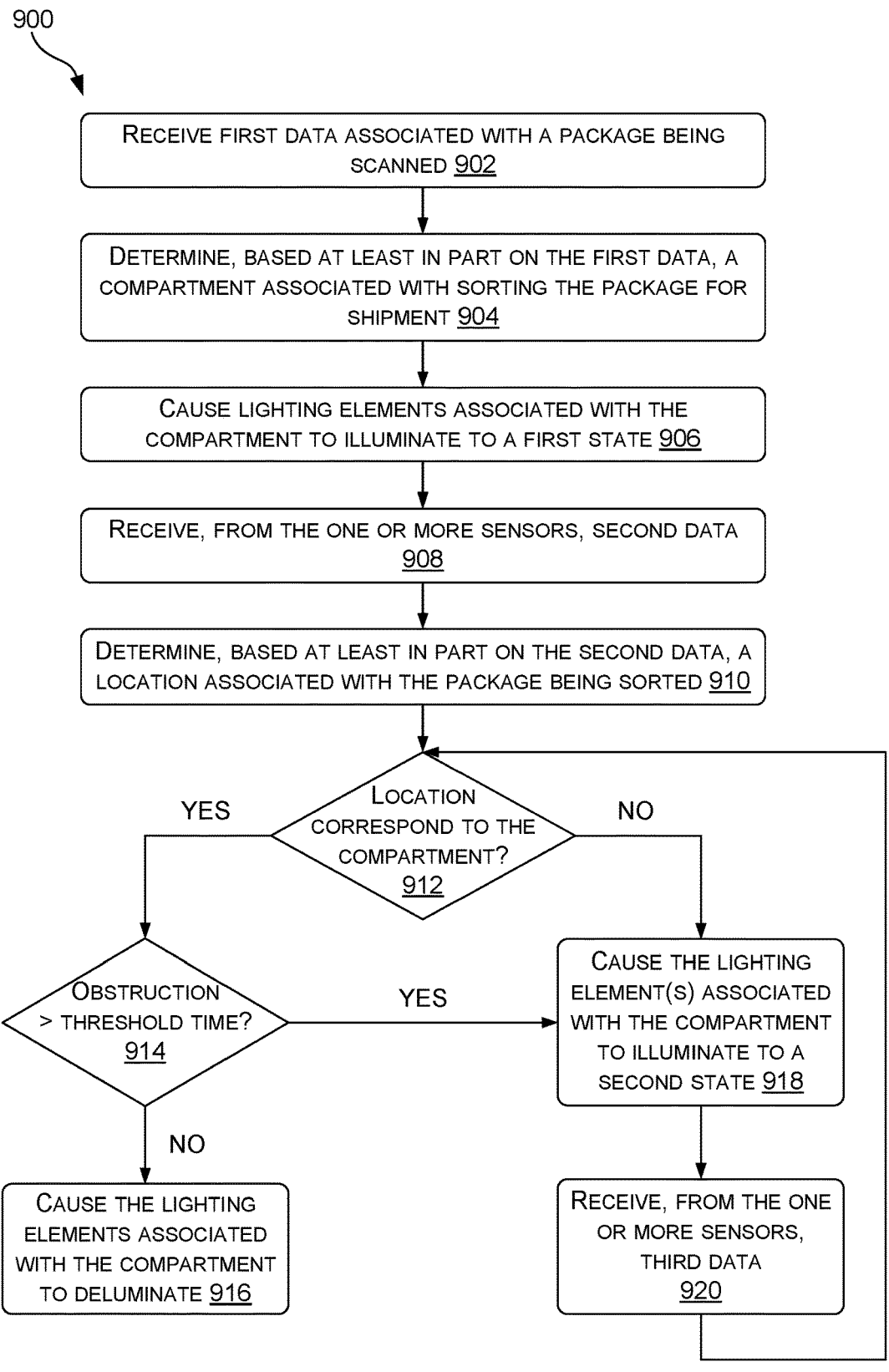

900

RECEIVE FIRST DATA ASSOCIATED WITH A PACKAGE BEING SCANNED 902

DETERMINE, BASED AT LEAST IN PART ON THE FIRST DATA, A COMPARTMENT ASSOCIATED WITH SORTING THE PACKAGE FOR SHIPMENT 904

CAUSE LIGHTING ELEMENTS ASSOCIATED WITH THE COMPARTMENT TO ILLUMINATE TO A FIRST STATE 906

RECEIVE, FROM THE ONE OR MORE SENSORS, SECOND DATA 908

DETERMINE, BASED AT LEAST IN PART ON THE SECOND DATA, A LOCATION ASSOCIATED WITH THE PACKAGE BEING SORTED 910

LOCATION CORRESPOND TO THE COMPARTMENT? 912

YES          NO

OBSTRUCTION > THRESHOLD TIME? 914

YES

CAUSE THE LIGHTING ELEMENT(S) ASSOCIATED WITH THE COMPARTMENT TO ILLUMINATE TO A SECOND STATE 918

NO

CAUSE THE LIGHTING ELEMENTS ASSOCIATED WITH THE COMPARTMENT TO DELUMINATE 916

RECEIVE, FROM THE ONE OR MORE SENSORS, THIRD DATA 920

FIG. 9

PACKAGE SORTATION AUTOMATION USING LIDAR SENSORS

BACKGROUND

The development of e-commerce has brought about an increase in order fulfillment, shipping, and distribution. For example, within logistic centers or warehouses, packages are sorted for shipment. As part of this process, scanner(s) or other imaging device(s) are used to determine how to sort packages to their final destinations. For example, personnel working within warehouses may utilize hand-held scanner(s) to scan barcodes, labels, or other identifier(s) on the packages. Therein, the personnel may sort packages to proper destinations. The process of scanning the packages, however, is often labor intensive and prone to error.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIG. 8 illustrates an example process for determining whether packages are correctly sorted, according to an embodiment of the present disclosure.

FIG. 9 illustrates an example process for determining whether packages are correctly sorted, and outputting indications of such within the sortation area, according to an embodiment of the present disclosure.

DETAILED DESCRIPTION

Figure 1:
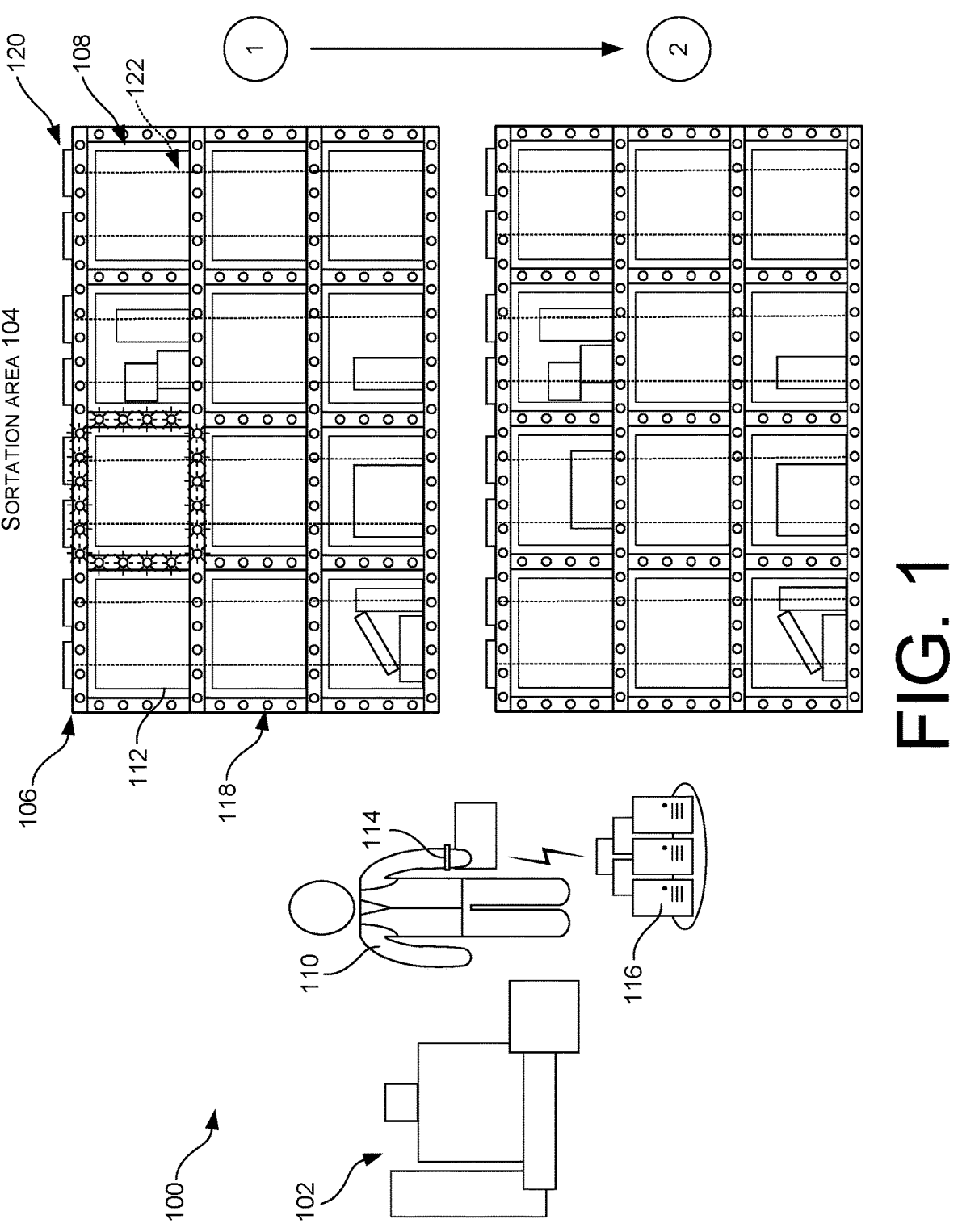
FIG. 1 illustrates an example environment including a sortation area in which packages are sorted for shipment, according to an embodiment of the present disclosure. Within the sortation area, associates may initially scan the packages to determine a compartment within the sortation area in which the package is to be sorted. As part of this, lighting elements may illuminate to indicate the compartment among other compartments. Sensors, such as LiDAR sensors, are used to determine whether the packages were placed in the correct compartment. If so, the lighting elements may deluminate or change state and the personnel may scan another package for sortation. If not, the lighting elements may illuminate to a different state (e.g., color) to indicate that the packages was incorrectly sorted. In doing so, the LiDAR sensors may be used as a way to confirm the sortation of the packages.

This application is directed, at least in part, to systems and methods that determine a sortation of packages within a sortation area of a building, warehouse, or other facility. Initially, packages may arrive at the sortation area for sortation to their final destination. As part of sorting the packages to their final destination, the packages may be placed within compartments. As compartments become full, the packages may be readied for shipment. An associate working at the sortation area may scan the package for determining a corresponding compartment for sorting the package. The compartment in which the package is to be placed may be highlighted or otherwise indicated. For example, lighting element(s) disposed around the compartment may illuminate to visually indicate to the compartment among the other compartments. Sensor(s), such as LiDAR sensor(s), may be arranged around the sortation area to detect whether the packages are placed in their appropriate compartments. For example, the LiDAR sensors may be used to determine a location that the associate places the package. This location may be compared against a known location of the compartment within the sortation area for determining whether the package was correctly or incorrectly sorted. If incorrectly sorted, an indication may be provided to the associate, such as changing a color of light emitted by the lighting element(s). The use of the LiDAR sensor(s) may decrease an amount of scans required by the associate during sortation, and as a result, a throughput of package sortation within the facility may increase.

The sortation area in the facility may represent a region in which packages (e.g., boxes, envelopes, etc.) are arranged, organized, or otherwise sorted. For example, after item(s) are packaged and readied for shipment, the packages may arrive at the sortation area via conveyors, totes, robots, and so forth. At the sortation area, a structure (e.g., shelving, carts, etc.) may include a number of disparate cubbies, stalls, or compartments in which the packages are placed. Each of the compartments may be associated with or correspond to a respective delivery location, address, or final destination. In some instances, the structure defines a plurality of rows and columns that are arranged in a grid-like fashion. The rows and columns define the compartments that are side by side, overhead, and adjacent to one another. In this manner, the compartments are used to organize packages that are destined for a similar to like location. Bags, bins, or other containers may be placed within respective compartments. As the containers are filled, the containers may be removed, whether by the associate or autonomously, for delivery. For example, the containers may be placed onboard trucks, trailers, and the like for shipment to their final destination.

Initially, an associate operating at the sortation area may scan the package to determine how to sort the package, or within which compartment of the sortation area that the package is to be sorted. The associate, for example, may wear a wearable device having a scanner. In some instances, the wearable device may represent a device that is worn on or around the wrist of the associate. The wearable device may also include a ring scanner that is worn around or on the finger of the associate. Here, the ring scanner, or more generally the scanner, may include an imaging device that scan(s) or otherwise read(s) a barcode, label, or other identifier on the package. Using the identifier, a compartment within the sortation area is determined for sorting the package. That is, among the compartments within the sortation area, a specific compartment is determined for sorting the package.

In some instances, the compartment is indicated using visual, audible, or other cues. For example, the structure may include lighting elements, such as light emitting diode(s) (LEDs) that illuminate to indicate the compartment associated with sorting the package. In some instances, the lighting elements may surround or at least partially surround the compartment. For example, the lighting elements may couple to or be integrated within the structure. Responsive to the package being scanned and determining the compartment, the lighting elements may illuminate (e.g., fully, partially, etc.) to visually indicate the compartment. Therein, the associate may travel to the compartment and place the package within the compartment.

The LiDAR sensors are arranged on the structure, for example, to detect a location at which the package is placed within the sortation area. For example, in some instances, the LiDAR sensors may be mounted overhead of the compartments and emit signals in front of the compartments. In some instances, the LiDAR are arranged to emit signals in a direction towards a ground, vertically below the compartments. As the associate places packages in the compartments, the LiDAR sensors may receive reflected signals. These reflected signals are indicative of an object within a field of view of the LiDAR sensors, such as the associate placing packages in the compartments. In other words, the reflected signals are indicative of an impedance (e.g., disturbance) in the signals emitted from the LiDAR sensors. Here, the LiDAR sensors detect this impedance for determining a location corresponding to the placement of the package. By comparing the location with a known location of the compartment, the systems and methods are able to determine whether the package was placed in the proper compartment.

For example, the LiDAR sensors may receive the reflected signals and generate sensor data. The sensor data may indicate a distance from the LiDAR sensors to the detected object. This distance is used to determine a location of the detected object within the sortation area. This location is compared against known locations of the compartments in the sortation area associated with sorting the package. For example, each compartment may be associated with certain coordinate positions, range of positions, or a certain distance from the LiDAR sensors. By measuring the distance to the detected object, this distance is compared to the known locations of the compartments for knowing which compartment in the sortation area that the package was placed. The comparison determines whether the package was placed in the proper compartment.

In instances where the package was placed in the proper compartment, the associate may retrieve an additional package for sortation. Here again, the associate may scan the additional package and a corresponding compartment in the sortation center may be indicated by the lighting elements. Additionally, when properly sorted, the lighting elements around the compartment may deluminate or change state. Further, other lighting elements are illuminated around a subsequent compartment.

Comparatively, if the package was not correctly sorted, the lighting elements may illuminate to indicate such. For example, the lighting elements may flash, blink, flicker, or output light in a particular pattern (e.g., on/off), or change state (e.g., color). This visual cue may provide feedback to the associate that the package was incorrectly sorted. In response, the associate may retrieve the missorted package and place the package in the proper compartment. During this process, the LiDAR sensors are used to determine whether the package was placed in the proper compartment.

In this manner, the LiDAR sensors are used during the sortation process and as the associate sorts the packages. This allows for a determination of whether the packages were sorted correctly, as well as permitting the associate to sort further packages. For example, the associate may be prohibited from sorting a second package in a second compartment until a first package has been correctly sorted in a first compartment. Responsive to associate placing the first package in the first compartment, the associate may then be permitted to scan the second package for sorting the second package in the second compartment. This allows the associate to progress through sorting packages at the sortation area and within respective compartments.

As noted above, the LiDAR sensors may be placed overhead of the compartments. In some instances, the LiDAR sensors are arranged to monitor specific columns of compartments. For example, in some instances, the structure within the sortation area may define three rows of compartments and four columns of compartments. In this example, the structure may therefore include twelve compartments in which the packages are sorted. The LiDAR sensors may be arranged to monitor the compartments in respective columns. Any number of LiDAR sensors may be used to monitor the column of compartments. For example, two LiDAR sensors may be arranged to monitor each column of compartments. Continuing with the above example where three rows and four columns are included, a total of eight LiDAR sensors may be used. Here, two LiDAR sensors may be arranged to monitor a first column, two LiDAR sensors may be arranged to monitor a second column, two LiDAR sensors may be arranged to monitor a third column, and two LiDAR sensors are arranged in the fourth column. In some instances, the number of LiDAR sensors may be based at least in part on a size of the compartments (e.g., height, depth, cross-sectional dimension, and/or width), a size of packages sorted, a number of compartments, and so forth. In some instances, the use of multiple LiDAR sensors permits detection of the associate sorting the package within the compartments with increased granularity. However, in some instances, a single LiDAR sensor may be used to monitor a respective column, and/or a single LiDAR sensor may be used to monitor compartments across columns. Additionally, although discussed herein as using LiDAR sensors, in some instances, time of flight (ToF) cameras may be used to create a depth map to determine which compartments that the packages were sorted into.

Additionally, or alternatively, the LiDAR sensors may be used to determine when the containers are removed from or placed into the compartments. For example, when the container becomes full, the container may be removed from the sortation area for further processing (or shipment). In such instances, the LiDAR sensors may detect an interference and determine that the container was removed, as well as from which compartment the container was removed. In some instances, knowing that the container was removed may be used to provide indications to the associate to replace the container in the compartment (e.g., with another container), or packages may not be permitted to be sorted into the compartment without the container. Other packages destined for other containers, however, may be sorted. Furthermore, knowing that the container was removed from the compartment, or more generally the sortation area, may signify that the container (and the packages contained therein) are ready for shipment. This may be used to dispatch drivers or other delivery personnel to pick up or further process the container for shipment (e.g., place onto delivery truck). Upon a new container being placed in the compartment, the LiDAR sensors may correspondingly detect this interference for knowing that the container was placed in the compartment. In turn, packages may be deliverable to the container.

In addition to providing visual cues for sorting the packages audible cues may be output within the sortation area. Certain chimes, for example, may be output to indicate whether the associate correctly or incorrectly sorted the package into the compartments. In some instances, the chimes may be output on the wearable device of the associate. Additionally, the wearable device may also include a display that presents indications of the packages being incorrectly or correctly sorted. Haptic device(s) of the wearable device may also provide haptic feedback, such as when the package is scanned, correctly sorted, incorrectly sorted, and so forth.

In some instances, the wearable device communicates with a control system located within the facility. The control system may store information associated with the packages and the facility. As the wearable device scans the package, the wearable device may communicate with the control system. The control system, using information associated with the facility and the sortation area, may determine a proper compartment for sorting the package. In turn, the control system may cause the lighting elements to illuminate the compartment. Additionally, the control system may receive sensor data from the LiDAR sensors for determining whether the package was placed in the proper compartment. In such instances, the lighting elements and/or the LiDAR sensors may be components of the control system, or may be components of separate devices, systems, and the like that are communicatively coupled to the control system. Additionally, the facility may include any number of sortation areas at which respective associates operate. The control system may respectively communicate with the wearable devices of the associates, as well as respectively control the lighting elements as well as receive sensor data from the LiDAR sensors across the sortation areas.

In some instances, more than one associate may operate within a given sortation area. In this instance, the wearable devices of the associates may respectively scan packages and communicate with the control system. To instruct the associates as to the compartments within the sortation area for sorting the packages, the lighting elements may respectively indicate which compartment the associates are to sort the packages. For example, the lighting elements may illuminate blue for a first associate upon a first package being scanned, and illuminate green for a second associate upon a second package being scanned. This color-coordination may allow multiple associates to simultaneously operate within a given sortation area.

In some instances, the LiDAR sensors, the lighting elements, and/or the compartments themselves may be movable within the sortation area. For example, movable storage racks or storage carts may be moved into the sortation area, where the moveable storage racks may include or define the compartments. Here, the LiDAR sensors and/or the lighting elements may be disposed on a frame or structure of the moveable storage rack. The process for detecting the sortation of the packages may be similar. However, in instances where the LiDAR sensors and/or the lighting elements are disposed on the movable storage racks, the LiDAR sensors and/or the lighting elements may be controlled, either wirelessly or wired, via the control system. For example, connectors may communicatively couple the LiDAR sensors and/or the lighting elements to or with the control system.

The system and methods disclosed herein therefore provide techniques for increasing a sortation of packages within a facility by eliminating instances of scanning the packages. For example, the LiDAR sensors are used to detect when packages are sorted within the sortation area for instructing associates as to subsequent packages in need of sortation. The LiDAR sensors further detect whether the packages are correctly sorted, and if not, visual cues may be output to the associate. In doing so, the LiDAR sensors are used to ensure that the packages are correctly sorted and increase a throughput of packages in the facility.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example environment 100 in which packages 102 are sorted or otherwise fulfilled, processed, and/or categorized for shipment. In some instances, the environment 100 may represent a distribution center, warehouse, cross-docking station, or other facility in which the packages 102 are fulfilled, processed, and/or categorized for shipment. Although not shown, the environment 100 may include inventory for shipment. Generally, the inventory stores an inventory of items (e.g., clothing, electronics, toys, household goods, etc.). In some instances, the items may be stored in bins, slots, shelves, containers, crates, stalls, racks, etc. The inventory may be dispersed about the environment 100 and/or may be located in dedicated areas of the environment 100 (e.g., perimeter). Additionally, or alternatively, in some instances, the inventory may be located separate from the environment 100. In this sense, the environment 100 may not include the inventory, such as in a cross-docking station. Here, the environment 100 may receive previously packaged items for further sortation and/or delivery to a variety of destinations.

The environment 100 is shown including a sortation area 104 in which the packages 102 are sorted. For example, as orders are processed for shipment, the orders (e.g., the packages 102) may be conveyed or otherwise transported within the environment 100 to the sortation area 104. Conveyors, trolleys, pallet jacks, and the like may be used to transport the packages 102 within the environment 100 to the sortation area 104. Generally, the sortation area 104 represents a region, zone, or portion of the environment 100 in which the packages 102 are sorted based on their final destination. For example, within the sortation area 104, those packages 102 that are destined for a similar address, locale, or area may be grouped together. Such sortation may be based on city, street, buildings (e.g., apartment, business complex, zip code, etc.), and so forth.

The sortation area 104 is shown including a structure 106 that defines a plurality of compartments 108. The structure 106 may represent shelving, for example, that defines the compartments 108. As shown, each of the compartments 108 may be separated from one another, and may be arranged in columns or rows. For example, the structure 106 may define or include twelve compartments 108, where the compartments are arranged into three rows and four columns. However, although a particular number of compartments 108 are shown, the structure 106 may include more than or less than twelve compartments 108. Additionally, the compartments 108 may include a similar size and/or shape, or may include dissimilar sizes and shapes than shown.

Introduced above, each of the compartments 108 may be associated with a respective destination for sorting the packages. As the packages 102 arrive at the sortation area 104, for example, via a conveyor system, an associate 110 may sort the packages 102 to respective compartments 108 within the sortation area 104. For example, like packages 102 that are destined to a similar location may be sorted in the same compartment 108. In some instances, bags, bins, or containers 112 are placed within the compartments 108. As the packages 102 are sorted in the compartments 108, and more particularly the containers 112, the containers 112 may become full. At this point, the associate 110 (or another associate) may remove the container 112 and place the container 112 at another location within the environment 100 and/or the sortation area 104. For example, the container 112 may be placed on a truck, trailer, or other vehicle for delivery. An empty container 112 may be replaced on the compartment 108 for receiving further packages 102.

The associate 110 uses or has access to a device 114. In some instances, the device 114 is worn on or by the associate 110. For example, the device 114 may represent a wearable device that is worn on or around the wrist of the associate 110. The device 114 may include a scanner (or other imaging device) that scan a barcode, label, or other identifier on the packages 102. The identifier is used to determine a shipping address, for example, of the packages 102. Correspondingly, based on the shipping address, the compartment 108 associated with the shipping address is determined such that the associate 110 may sort the package 102 in the proper compartment 108.

In some instances, the device 114 communicatively couples to a control system 116. The control system 116 may be located within the environment 100 or remote from the environment 100. Upon the package 102 being scanned, the device 114 transmits information associated with the identifier to the control system 116. The control system 116 processes the identifier and determines an appropriate compartment 108 in which the package 102 is to be sorted. To make this determination, and as will be further discussed in FIG. 2, the control system 116 may have access to sortation area data and compartment data. The sortation area data may indicate specifics of the sortation area 104, such as the number of compartments 108, an arrangement of the compartments (e.g., rows and columns), and so forth. The compartment data, meanwhile, may indicate a location of the compartments 108 within the sortation area 104. The compartment data may also indicate an associated shipping address of the compartment 108. Therefore, the control system 116, using the identifier as scanned by the device 114, is able to determine the proper compartment 108 in the sortation area 104 for sorting the package 102.

To direct, instruct, or otherwise guide the associate 110 to the compartment 108, the control system 116 may cause lighting elements 118 to illuminate. In some instances, the lighting elements 118 may be disposed vertically and/or horizontally on the structure 106. For example, the lighting elements 118 may be placed on, integrated with, or coupled to the structure 106. In some instances, the lighting elements 118 surround (e.g., encircle) or at least partially surround the compartments 108. The lighting elements 118 are activated by the control system 116, for example, to visually instruct the associate 110 as to the compartment 108 for sorting the package 102. The light elements 118 are individually controllable to indicate the respective compartment 108 for sorting the packages 102.

For example, at "1" in FIG. 1, certain lighting elements 118 are shown being illuminated. The lighting elements 118 are illuminated around a specific compartment of the compartments 108, such as a compartment in a third row, second column (from left to right). These lighting elements 118 may be illuminated based on the device 114 scanning the package 102, and the control system 116 determining the compartment 108 for sorting the package 102. The lighting elements 118 serve to visually indicate to the associate 110 which compartment 108 the package 102 is to be sorted. The control system 116 may be configured to control those lighting elements 118 that are associated with the compartment 108, as compared to remaining lighting elements 118 dispersed about the structure 106 and associated with other compartments 108. Based on the visual cue provided by the lighting elements 118, the associate 110 may walk to the compartment 108 and deposit the package 102. As shown at "2," in response, the lighting elements 118 may deactivate and turn off. In other instances, the lighting elements 118 may illuminate to a different color to visually indicate to the associate 110 of the placement of the package 102 (e.g., green). The associate 110 may then continue to retrieve another package 102 to further sortation within the sortation area 104.

The sortation area 104 may further include sensors, such as LiDAR sensors 120, that are arranged to determine a sortation of the packages 102 within the sortation area 104. In some instances, and as shown in FIG. 1, the LiDAR sensors 120 are arranged vertically above the compartments 108 (above individual columns). For example, the LiDAR sensors 120 may couple to the structure 106 or be vertically disposed above the structure 106 (e.g., via a frame, bracket mount, etc.). The LiDAR sensors 120 output signals 122 in front of the compartments 108 (or more generally, the structure 106) to detect a location associated with the sortation of the package 102. For example, as the associate 110 places the package 102 in the compartment 108, light may bounce off portions of the associate 110 (e.g., arms) and/or the package 102. These reflected signals are detected by the LiDAR sensors 120 for use in determining where the package 102 was placed. As shown, the LiDAR sensors 120 are arranged to output the signals 122 in a direction towards a ground surface on which the structure 106 rests, for example. However, in some instances, the LiDAR sensors 120 may additionally or alternatively output the signals 122 horizontally, within rows of the compartments 108 and/or across columns of the compartments 108. In some instances, the LiDAR sensors 120 may be one dimensional (1D), two dimensional (2D), or three dimensional (3D) LiDAR sensors.

The control system 116 may communicatively couple via wired or wireless technologies to the LiDAR sensors 120. As the associate 110 sorts the packages 102, the control system 116 receives data generated by the LiDAR sensors 120. The control system 116 determines, using this sensor data, a location on the sortation area 104 corresponding to the sorting of the package 102. For example, the sensor data is analyzed to determine a location associated with an impedance of the signals 122 in the sortation area 104. This location may correspond to where the impedance in the sortation area 104 was sensed. The location is compared against a known location of the compartments 108, respectively, and a region of the sortation area 104 corresponding to the compartment 108, to determine whether the package 102 was properly sorted. In some instances, the sensor data is analyzed to determine a distance between the LiDAR sensors 120 and the detected object (e.g., the associate 110, the package 102, etc.). This distance is used to associate the detection with a specific position on the sortation area 104, and in turn, the position is compared against known locations of the compartments 108. Given the known location of the ground surface, for example, the LiDAR sensors 120 are used to determine impedances between the LiDAR sensors 120 and the ground surface.

The LiDAR sensors 120 are used to determine whether the packages 102 are correctly sorted within the sortation area 104. To briefly illustrate, and returning to "1" in FIG. 1, the signals 122 are shown being emitted by the LiDAR sensors 120 in a direction towards a bottom of the structure 106 (e.g., the ground). As the associate 110 places the package 102 in the compartment 108, for example, arms of the associate 110 and/or the package 102 may impede the signals 122. This impedance is detected in the form of reflected light by the LiDAR sensors 120. The control system 116, using sensor data indicative of the impedance, determines a location of the impedance and/or determines a distance between the LiDAR sensors 120 and the impedance. Upon determining the location and/or the distance, the control system 116 is able to determine a corresponding compartment 108 that is associated with the impedance. For example, the detected impedance may be compared against a range of positions associated with the compartment 108. If the impedance is within the range of position associated with the compartment 108, the control system 116 may determine that the package 102 was correctly sorted. In turn, the control system 116 may cause the lighting elements 118 around the compartment 108 to deluminate. However, in some instances, rather than deluminating, the lighting elements 118 may change color to indicate that the package 102 was correctly sorted (e.g., green).

Comparatively, if the control system 116 determines that the package 102 was placed in the wrong compartment 108, the control system 116 may cause an indication to be output. The indication, for example, may include causing the lighting elements 118 around the compartment 108 to turn red, or other color indicative of that package 102 being incorrectly sorted. As an example, if the associate 110 places the package 102 in a compartment located to the left or right of the proper compartment, the LiDAR sensors 120 may detect this impedance and the control system 116 may determine a position of the impedance. Comparison of the impedance against the range of positions associated with the proper compartment indicates that the package 102 was improperly sorted. In instances where the package 102 was improperly sorted, the associate 110 may be unable to continue to sort additional packages 102. For example, if a first package was improperly sorted, the associate 110 may be unable to scan a second package using the device 114 for sorting the second package 102. Instead, the associate 110 may be instructed to correctly sort the first package before moving onto scanning and sorting the second package. Such control may come by way of the control system 116.

Moreover, in some instances, the LiDAR sensors 120 may be used to determine obstructions that may impact determining the sortation of the packages 102. For example, if a package 102 extends out of the compartments 108, thereby impeding the signals 122, the LiDAR sensors 120 may detect such. This may, in some instances, prevent the LiDAR sensors 120 detecting a sortation of packages 102 that are vertically below the package 102 extending out of the compartment 108. Here, because the LiDAR sensors 120 are unable to detect such impedances, the LiDAR sensors 120 are unable to determine whether the packages 102 were correctly sorted. In these scenarios, the lighting elements 118 may illuminate to indicate the compartment 108 in which the package 102 is hanging over and impeding the signals 122. In some instances, detecting these instances, as compared to instances in which the associate 110 properly places the packages 102 inside the compartments and when the packages 102 do not impede the signals 122, may be based on detecting the impedance for a threshold amount of time. For example, if the impedance is detected for more than five seconds, the control system 116 may detect an error and/or determine than an object (e.g., the package 102) is obstructing the signals 122. The threshold time is determined so as to not output errors in instances where the associate 110 properly places the packages 102 in the compartment 108 and impedes the signals 122.

As shown, and in some instances, two LiDAR sensors 120 may be placed vertically above respective columns of compartments 108 in the sortation area 104. In some instances, the use of multiple LiDAR sensors 120 may increase an ability of the LiDAR sensors 120 to detect impedances and the sortation of the packages 102. For example, as shown, the LiDAR sensors 120 may be horizontally spaced apart from one another to detect impedances on left and right sides of the compartments 108. Alternatively, more than or less than two LiDAR sensors 120 may be used. For example, a single LiDAR sensor may be centrally aligned on the compartments 108. In some instances, the number of LiDAR sensors 120 may be based at least in part on a size of the compartments 108 (e.g., height and/or width), a size of packages 102 sorted, a number of the compartments 108, and so forth. However, in some instances, a single LiDAR sensor may be used to monitor a respective column, and/or a single LiDAR sensor may be used to monitor compartments (e.g., two, three, four, etc.) across columns. Additionally, although discussed herein as using LiDAR sensors, in some instances, time of flight (ToF) cameras may be used to create a depth map to determine which compartments that packages were sorted into.

In some instances, the LiDAR sensors 120 may also be used to determine when the containers 112 are removed from or placed into the compartments 108. For example, when the container 112 becomes full, the container 112 may be removed from the sortation area 104. In such instances, the LiDAR sensors 120 may detect the interference and determine that the container 112 was removed, as well as from which compartment 108 the container 108 was removed. In some instances, knowing that the container 112 was removed may be used to provide indications to the associate 110 to replace the container 112 in the compartment 108 (e.g., with another container), or packages 102 may not be permitted to be sorted into the compartment 108 without the container 112. Other packages destined for other containers 112, however, may be sorted. Furthermore, knowing that the container 112 was removed from the compartment 108, or more generally the sortation area 104, may signify that the container 112 (and the packages 102 contained therein) are ready for shipment. This may be used to dispatch drivers or other delivery personnel to pick up or further process the container 112 for shipment (e.g., place onto delivery truck). Upon a new container being placed in the compartment 108, the LiDAR sensors 120 may correspondingly detect this interference for knowing that the container 112 was placed in the compartment 108. In turn, packages 102 may be deliverable to the container 112.

Although the environment 100 is shown including one sortation area, the environment 100 may include any number of sortation areas 104. In such instances, the control system 116 may respectively control lighting elements 118 across the different sortation areas 104 for instructing associates 110 as to the compartments 108 in which the packages 102 are to be placed. In such instances, the control system 116 may communicate with respective devices 114 of the associates 110 for receiving the identifiers as scanned. Additionally, the control system 116 may respectively receive sensors data from the LiDAR sensors 120 for determining whether the packages 102 were sorted in the proper compartment 108.

Still, although the techniques are described herein as being included or performed within the sortation area 104, the techniques described herein may be performed at other locations and/or for other functionalities than sorting packages 102. For example, at an inventory station in which inventory is resupplied to shelves, the techniques described herein may guide and instruct associates as to the proper area to place or otherwise sort the inventory. From there, the inventory may be packaged and shipped. Other environments or functionalities, however, are envisioned for visually instructing persons as to the correct placement of goods, as well as confirming that the goods were placed in correct locations.

In some instances, the LiDAR sensors 122, the lighting elements 118, and/or the compartments 108 may be movable within the sortation area 104. For example, movable storage racks or storage carts may be moved into the sortation area 104, where the moveable storage racks may include or define the compartments 108. Here, the LiDAR sensors 120 and/or the lighting elements 118 may be disposed on a frame or structure of the moveable storage rack. The process for detecting the sortation of the packages 102 may be similar. However, in instances where the LiDAR sensors 120 and/or the lighting elements 118 are disposed on the movable storage racks, the LiDAR sensors 120 and/or the lighting elements 118 may be controlled, either wirelessly or wired, via the control system 116. For example, connectors may communicatively couple the LiDAR sensors 120 and/or the lighting elements 118 to or with the control system 116.

Figure 2:
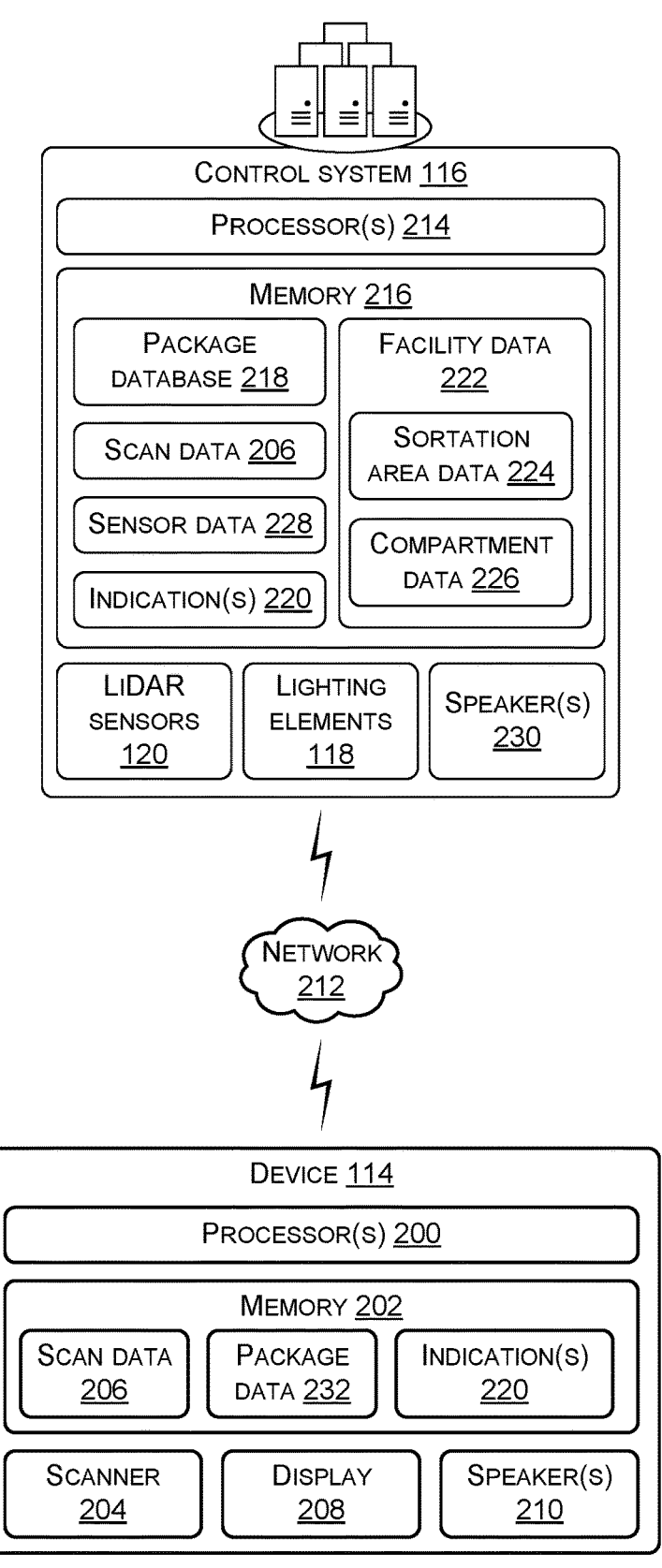
FIG. 2 illustrates example components of a control system and example components of a device in communication with the control system, according to an embodiment of the present disclosure.

FIG. 2 illustrates select components of the device 114 and the control system 116. Beginning with the device 114, the device 114 is shown including processor(s) 200 and memory 202, where the processor(s) 200 may perform various functions and operations associated with scanning the packages 102 and outputting information associated with the packages 102 being sorted, and the memory 202 may store instructions executable by the processor(s) 200 to perform the operations described herein.

In some instances, the device 114 represents any suitable device, such as, for example, a mobile device (e.g., phone, table, etc.), personal assistant, computer, and the like. In some instances, the device 114 represents a device that may be worn on or by the associate 110. For example, the device 114 may represent a handheld device that is held in hand of the associate 110, a wristwear device that may be worn around the wrist and/or arm of the associate 110, and so forth.

The device 114 includes a scanner 204 that represents a reader capable of scanning or otherwise reading a barcode, QR code, series of numbers, shipping label, or other identifiers on the package 102. For example, the identifiers may be scanned and utilized to determine information associated with the packages 102 (e.g., weight, size, recipient, shipper, addresses, etc.). In some instances, the scanner 204 represents a finger or ring scanner that is worn around one or more fingers of the associate 110. Such implementation may allow the associate 110 to scan the packages 102 without physically holding the scanner 204, but rather, the scanner 204 may be directed towards the identifier on the packages 102 by movement of the fingers, wrist, arm, and so forth of the associate 110. In instances where the scanner 204 represents a ring scanner, the scanner 204 may communicatively couple to the device 114 worn around the wrist of the associate 110, for example, via one or more cables, wires, etc. Alternatively, in some instances, the scanner 204 may be a separate component as the device 114 and wirelessly couple to the device 114, for example, via Bluetooth, NFC, Bluetooth low energy (BLE), and so forth.

The scanner 204, or more generally the device 114, generates scan data 206 that is associated with scanning the identifier on the packages 102. As shown, the scan data 206 may be stored in the memory 202 of the device 114. In some instances, the scan data 206 may represent image(s), text, and so forth that is associated with the identifiers of the packages 102 and which is used to identify the packages 102 being scanned.

The device 114 is further shown including a display 208 that outputs content associated with the packages 102. The display 208 may represent any suitable display (e.g., LCD, OLED, LED, etc.). Speaker(s) 210 of the device 114 may output sound in response to the packages 102 being scanned. For example, following a scanning of the packages 102, the speaker(s) 210 may output a chime indicative of the packages 102 being scanned. The display 208 of the device 114 may also output an indication of the package 102 being placed in the compartment 108. For example, the control system 116 may transmit an acknowledgement to the device 114 that displays whether the package 102 was correctly sorted. Such acknowledgement may also allow the device 114 to scan other packages 102.

The device 114 may include other input/output (I/O) components that facilitate scanning and/or sorting the packages 102. For example, the device 114 may include haptic device(s) that provide haptic feedback when the associate 110 scans the package 102, sorts the package 102, and so forth. In some instances, the haptic device(s) may output first feedback when the package 102 is correctly sorted (e.g., first intensity), and may output second feedback when the package 102 is incorrectly sorted (e.g., second intensity). The second feedback may be greater than the first feedback to indicate to the associate 110 that the package 102 was incorrectly sorted. This may serve as an alert for the associate 110 to resort the package 102.

The device 114 communicatively couples to the control system 116 via one or more network(s) 212. The network(s) 212 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The device 114 and the control system 116 include suitable components, interfaces, and the like for communicating over the network(s) 212.

The control system 116 is shown including processor(s) 214 and memory 216, where the processor(s) 214 may perform various functions associated with determining a sortation of the packages 102 and outputting information associated with the packages 102 being sorted, and the memory 216 may store instructions executable by the processor(s) 214 to perform the operations described herein. For example, the control system 116 may receive the scan data 206 from the device 114. Using the scan data 206, the control system 116 may determine information associated with the package 102. For example, the control system 116, using the scan data 206, may identify the package 102, respectively, within a package database 218.

Generally, the package database 218 may represent a registry of recorded packages that are in the process of being shipped. Through a comparison of the identifier(s) captured within the scan data 206 and identifying information stored in the package database 218, the destination of the packages 102 may be determined. By determining the destination of the packages 102, the packages 102 may be sorted within the sortation area 104. As such, as the packages 102 are scanned, the package database 218 may be accessed for determining information about the packages 102.

The information about the packages 102 is used to determine a compartment 108 within the sortation area 104 for sorting the package 102. For example, the control system 116 may determine which compartment 108 that the package 102 is to be placed. After determining the compartment 108, the control system 116 may cause the lighting elements 118 to illuminate. The lighting elements 118 may respectively illuminate around the determined compartment 108 within the sortation area 104 for guiding the associate 110 and sorting the package 102.

In some instances, the lighting elements 118 may be controlled to output respective indication(s) 220, such as a color of light, a frequency (e.g., blinking), a pattern, at which the lighting elements 118 illuminate, a brightness (e.g., luminosity) of the lighting elements 118, and so forth. In this manner, the control system 116 may respectively control those lighting elements 118 around the compartment 108, as compared to other lighting elements 118 on the sortation area 104, for highlighting, identifying, or otherwise emphasizing the compartment 108 for sorting the package 102.

To aid in this determination, the memory 216 is further shown storing or having access to facility data 222. The facility data 222 may be associated with a facility, or the environment 100, in which the sortation area 104 is located. For example, the facility data 222 may indicate a structure of the facility, a location of sortation areas 104, inbound stations, outbound stations, inventory locations, locations of conveyors, and so forth. The facility data 222 is further shown including sortation area data 224 and compartment data 226.

The sortation area data 224 may include information associated with the sortation areas 104 in the facility. For example, within the facility, a plurality of sortation areas 104 may be included for sorting packages 102 to their final destination. The sortation area data 224 may indicate locations of each of the sortation areas 104 within the facility. In some instances, each sortation area 104 is associated with sorting the packages 102 to different cities, states, locales, zip codes, and so forth. The sortation area data 224 may also indicate, within each of the sortation areas 104, the number of compartments 108, how the compartments 108 are organized, distributed, laid out, and so forth. For example, the sortation area data 224 may indicate the position of each compartment within a columns and rows of the sortation areas 104. This may, for example, be used to determine which compartments 108 are located above one another, beside one another, below one another, and so forth.

The compartment data 226, meanwhile, may indicate a respective location of the compartments 108 within the sortation areas 104. For example, each of the compartments 108 in the sortation areas 104 may be associated with a certain range of positions (vertically and horizontally). Knowing the range of positions allows the control system 116 to determine which compartment 108 the package 102 is to be placed. The compartment data 226 may also indicate a size, shape, or volume of the compartments 108.

Upon determining the location of the compartment 108 in which the package 102 is to be sorted, as noted above, the control system 116 may cause those lighting elements 118 arranged at least partially around the compartment 108 to be illuminated. This may be accomplished knowing the relative positioning of the compartment 108 within the sortation area 104 (e.g., via the sortation area data 224 and the compartment data 226) to determine which lighting elements 118 to instruct to illuminate.

The control system 116 is further shown including the LiDAR sensors 120. The LiDAR sensors 120 are arranged to output the LiDAR signals 122 for detecting locations associated with the packages 102 being sorted. For example, as packages 102 are placed in the compartments 108, the associate 110 and/or the package 102 itself impedes the LiDAR signals 122. This impedance may be sensed by the LiDAR sensors 120. The impedance may therein be used to determine a location of the impedance, relative to the LiDAR sensors 120, for knowing which compartment 108 the package 102 was placed. Here, as indicated above, each of the compartments 108 may be associated with a range of positions within columns at the sortation area 104. As the impedances are detected, and the location is determined, the location is compared against the range of positions associated with the compartments 108, respectively. Such range of positions may be stored in the compartment data 226. As such, a look up or comparison to the compartment data 226 indicates whether the package 102 was properly sorted.

For example, sensor data 228 generated by the LiDAR sensors 120 may be indicative of a sensed object. As each column of the sortation area 104 may include respective LiDAR sensors 120, the control system 116 may analyze the sensor data 228 to determine where (if any) the impedances of the LiDAR signals 122 were sensed. The sensor data 228 therefore indicates a location of the impedance within the sortation area 104. This location is compared against range of positions associated with compartments 108 on the sortation area 104. For example, once the location of the impedance is known, this location may be compared against the range of positions associated with the compartments 108. This comparison may indicate which compartment 108 the package 102 was placed. That is, by associating the impedance with a particular compartment 108, the control system 116 is able to determine whether the package 102 was placed in the correct compartment 108. In this manner, the LiDAR sensors 120 may be used as a way to track the sortation of the packages 102 within the sortation area 104, as well as determining whether the packages 102 were correctly sorted within the sortation area 104.

In instances where the package 102 is correctly placed, the control system 116 may cause the lighting elements 118 around the compartment 108 to deactivate. By deactivating or deluminating the lighting elements 118, the control system 116 may control other lighting elements 118 within the sortation area 104 for instructing the associate 110 as to further compartments 108 for sorting other packages 102. In other instances, however, the control system 116 may cause the lighting elements 118 to output other indications, such as changing color, frequency, and so forth. In instances where the package 102 was incorrectly sorted, such as being placed in the wrong compartment 108, the control system 116 may cause the lighting elements 118 around the compartment 108 to illuminate. In some instances, the lighting elements 118 may be illuminated to a different state or output a different notification that is/are different than the first state. For example, the lighting elements 118 may illuminated red to indicate the improper placement of the package 102 in the wrong compartment 108.

The control system 116 may further analyze the sensor data 228 to determine obstructions on the sortation area 104. For example, after placing the package 102 in the compartment 108, the package 102 may overhang from within the compartment 108 and obstruct the one or more of the LiDAR signals 122. To make this determination, the control system 116 may continue to receive sensor data 228 for determining whether an object (e.g., associate 110, package 102, etc.) is detected. If the object is detected for the threshold time, this may be indicative of the package 102 extending beyond the compartment 108, as compared to the associate 110 placing the package 102 in the compartment 108. That is, if the impedance is continued to be detected, the control system 116 may determine that this impedance corresponds to the package 102 extending beyond the compartment 108. This threshold of time, for example, may be greater than an amount of time associated with the associate 110 placing the package 102 in the compartment 108. In instances where there is an obstruction, the lighting elements 118 may output another indication 220 notifying the associate 110.

The control system 116 is further shown including speaker(s) 230. The speaker(s) 230, for example, may output audio in instances where the packages 102 were scanned, correctly placed in the compartment 108, incorrectly placed in the compartment 108, and so forth. In some instances, the speaker(s) 230 may located within or throughout the sortation area 104, coupled to the structure 106, and so forth.

Although the LiDAR sensors 120, the lighting elements 118, and the speaker(s) 230 are shown as components of the control system 116, the LiDAR sensors 120, the lighting elements 118, and/or the speaker(s) 230 may be located physically separate from the control system 116. For example, the LiDAR sensors 120, the lighting elements 118, and/or the speaker(s) 230 may located at the sortation areas 104, whereas the processor(s) 214, the memory 216, and other computational components may be located remote from the sortation area 104 but within the environment 100. In such instances, however, the LiDAR sensors 120, the lighting elements 118, and the speaker(s) 230 may couple with the remaining components of the control system 116 using wired or wireless technologies. However, the LiDAR sensors 120, the lighting elements 118, and the speaker(s) 230 may be components of the control system 116 for detecting the sortation of the packages within the sortation area 104. The control system 116 may also communicatively couple to the other devices, databases, and so forth that are remote from the environment 100.

In some instances, the control system 116 transmits package data 232 and/or the indication(s) 220 to the device 114 for output. For example, the display 208 may output indication(s) 220, such as errors, when the packages 102 are incorrectly sorted within the sortation area 104. The display 208 may also indicate the current package 102 being sorted, using the package data 232 from the package database 218. The indication(s) 220 may also include audio or sound to be output by the speaker(s) 210.

In some instances, the lighting elements 118 may be disposed on, about, or within the structure 106 of the sortation area 104. The lighting elements 118 may represent LEDs, OLEDs, or other suitable lamps for outputting light. The lighting elements 118 may represent LED strips, LED flexible strips, and the like. Cables that are used to power and/or control the lighting elements 118 may be routed within components of the structure 106, for example, within frames, bars, channels, and so forth. The lighting elements 118 are capable of being individually controlled by the control system 116 to illuminate, change color, dim, and so forth.

The LiDAR sensors 120 may represent any suitable LiDAR sensor. The LiDAR sensors 120 may have a range up to 10 meters (m), 20 m, 30 m, and so forth. In some instances, the LiDAR sensors 120 are able to achieve range accuracy of 0.5 millimeters (mm) to 10 mm relative to the LiDAR sensors 120, and/or a mapping accuracy of up to 1.0 centimeter (cm). In some instances, the LiDAR sensors 120 may have a scan rate or frame rate of approximately, or up to, 500 Hertz (Hz). Although discussed herein as using LiDAR sensors, other sensor(s) may additionally be used. For example, other ranging or distance sensors may be used (e.g., ultrasonic, infrared (IR), sound, etc.).

In some instances, the LiDAR sensors 120 include, or are individually coupled to, a respective LiDAR controller that transmits signals to the control system 116. The LiDAR sensors 120 are arranged to output signals, vertically, across a front of the compartments 108. For example, the compartments 108 may be arranged in columns within the sortation area 104, and the LiDAR sensors 120 may be arranged to monitor the columns for obstructions and impedances. In some instances, one, two, three, or any number of LiDAR sensors 120 may be arranged, per column, to detect the obstructions and impedances. However, in some instances, the LiDAR sensors 120 may additionally or alternatively output signals horizontally, within rows of the compartments 108.

In some instances, more than one associate 110 may operate within a given sortation area 104. In this instance, the devices 114 of the associates 110 may respectively scan packages 102 and communicate with the control system 116. To instruct the associates 110 as to the compartments 108 within the sortation area 104 for sorting the packages 102, the lighting elements 118 may respectively indicate which compartment 108 the associates 110 are to sort the packages 102. For example, the lighting elements 118 may illuminate blue for a first associate upon a first package being scanned and determining a first compartment for the first package. Additionally, the lighting elements 118 may illuminate green for a second associate upon a second package being scanned and determining a second compartment for the second package. This color-coordination may allow multiple associates 110 to simultaneously operate within a given sortation area 104. In some instances, the location of the associate 110 within the environment 100 may be known using location components (e.g., GPS) of the device 114. This may, in some instances, allow the control system 116 to determine which sortation area 104 the associates 110 are located, and correspondingly, permit the control system 116 to determine the compartments 108 when instructing the associates 110.

In some instances, the control system 116 may be located within the environment 100 and/or remote from the environment 100. The control system 116 may be implemented as one or more servers and may, in some instances, form a portion of a network-accessible computing platform implemented as a computing infrastructure of processors, storage, software, data access, etc. that is maintained and accessible via a network such as the Internet. Common expressions associated with the control system 116 include "on-demand computing", "software as a service (SaaS)", "platform computing", "network-accessible platform", "cloud services", "data centers", etc.

As used herein, a processor, such as the processor(s) 200 and/or the processor(s) 214 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionality described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

As used herein, memory, such as the memory 202 and/or the memory 216 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 3:
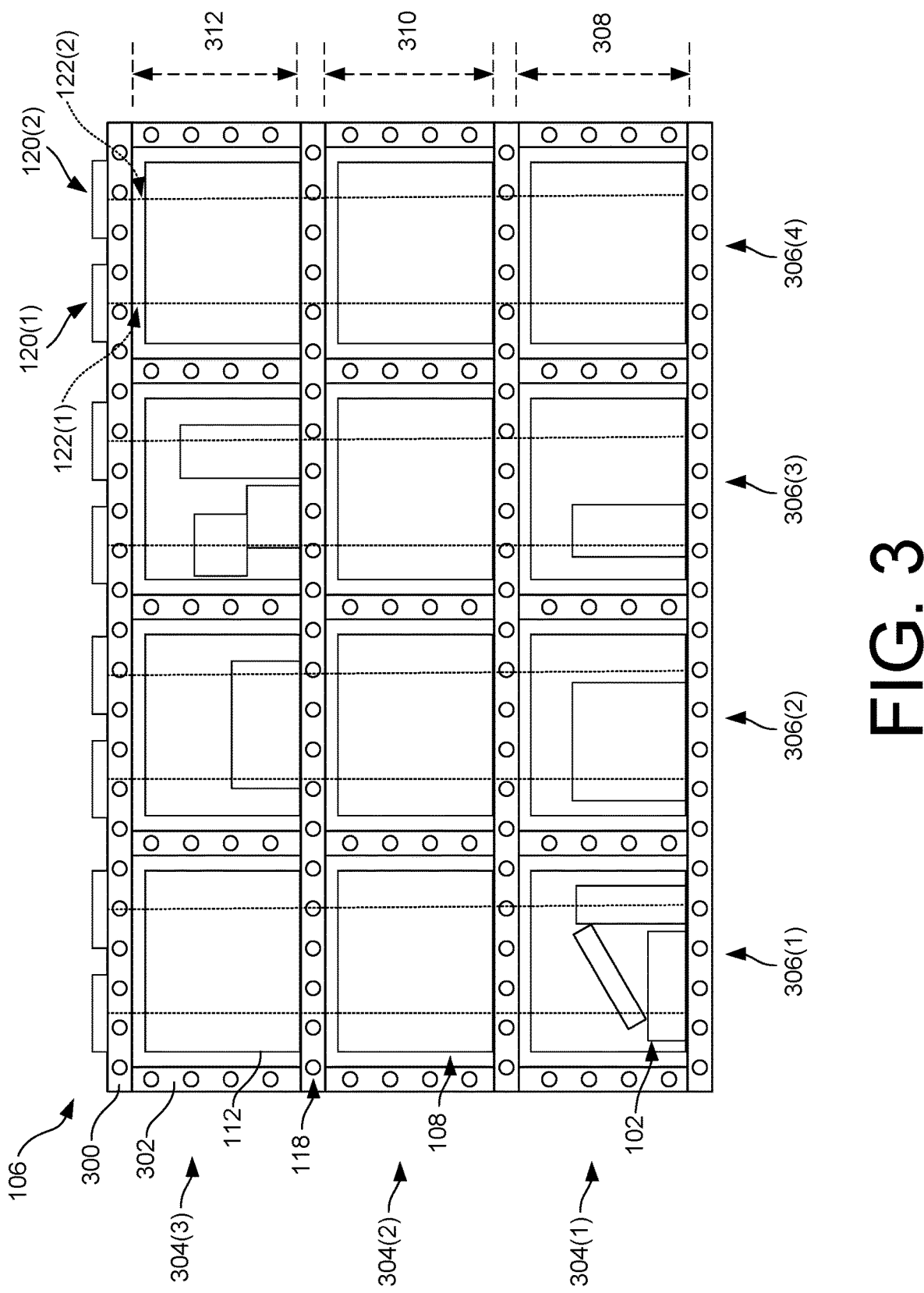
FIG. 3 illustrates an example structure within the sortation area of FIG. 1 that includes the compartments, according to an embodiment of the present disclosure.

FIG. 3 illustrates additional details of the structure 106. In some instances, the structure 106 is composed of horizontal members 300 and vertical members 302. The horizontal members 300 and the vertical members 302 may couple together (e.g., welds, fasteners, snap-fit, etc.) for defining the compartments 108. The horizontal members 300 and/or the vertical members 302 may represent metal frames, bars, and so forth that form the structure 106, as well as the compartments 108. The containers 112 are shown disposed within the compartments 108 and may receive the packages 102 being sorted.

The structure 106 may include any number of compartments 108. For example, FIG. 3 illustrates that the compartments 108 are arranged in a grid-like fashion, including three rows 304 and four columns 306. In such instances, the structure 106 may include twelve compartments 108. The rows 304 may include a first row 304(1), a second row 304(2) spaced vertically above the first row 304(1), and a third row 304(3) spaced vertically above the second row 304(2). The columns 306 may include a first column 306(1), a second column 306(2) adjacent to the first column 306(1) (e.g., to the right), a third column 306(3) adjacent to the second column 306(2) (e.g., to the right), and a fourth column 306(4) adjacent to the third column 306(3) (e.g., to the right). In this manner, the compartments 108 may be arranged in rows and columns on the structure 106.

The LiDAR sensors 120 are shown including a first LiDAR sensor (1) and a second LiDAR sensor 120(2). The first LiDAR sensor 120(1) and the second LiDAR sensor 120(2), or more generally the LiDAR sensors 120, are arranged to monitor an impedance of the signals 122 within the columns 306. For example, the first LiDAR sensor 120(1) outputs a first signal 122(1) and the second LiDAR sensor 120(2) outputs a second signal 122(2). As the packages 102 are placed in the compartments 108, the associate 110 and/or the package 102 itself impedes the first signal 122(1) and/or the second signal 122(2). This impedance is respectively sensed by the first LiDAR sensor 120(1) and/or the second LiDAR sensor 120(2). The impedance may therein be used to determine a location of the impedance, relative to the LiDAR sensors 120, for knowing whether the package 102 was placed in the correct compartment 108.

Each of the compartments 108 may be associated with a range of positions within the columns 306. As the impedances are detected, and the location is determined, the location is compared against the range of positions associated with the compartments 108, respectively. For example, in FIG. 3, a first compartment in the fourth column 306(4) may be associated with a first range of positions 308, a second compartment in the fourth column 306(4) may be associated with a second range of positions 310, and a third compartment in the fourth column 306 may be associated with a third range of positions 312. If an impedance is detected in the fourth column 306(4), for example, by one of the first LiDAR sensor 120(1) or the second LiDAR sensor 120(2), the location of the impedance is determined. This location is then compared against the first range of positions 308, the second range of positions 310, and the third range of positions for knowing which compartment in the fourth column 306 the impedance is associated within. This comparison allows the control system 116, for example, to determine whether the packages 102 were correctly sorted within the compartments 108.

The compartments 108 within the other columns 306 may be similarly associated with a respective range of positions. The LiDAR sensors 120 across the columns 306 are therefore configured to detect impedances, respectively, for determining the location of the impedance and then associating the impedance with a respective compartment 108. The LiDAR sensors 120 are further configured to detect impedances for outputting indications on the lighting elements 118 when the packages 102 extend beyond a front of the structure 106.

The lighting elements 118 are shown disposed on the horizontal members 300 and the vertical members 302. In some instances, the lighting elements 118 may be disposed on one of the horizontal members 300 or the vertical members 302. Regardless, the lighting elements 118 are used to indicate which compartment 108 is associated with sorting the packages 102. The lighting elements 118 may be disposed on the horizontal members 300 and/or the vertical members 302 to at least partially surround, border, or encircle the compartments 108. This way, when illuminated, the lighting elements 118 visually indicate the compartment 108 for sorting the package 102.

The structure 106 is shown including a particular number of compartments 108 and/or LiDAR sensors 120 that emit respective signals 122. However, the structure 106 may include more compartments 108 than shown, differently shaped or sized compartments 108, and so forth. Moreover, more than or less than two LiDAR sensors 120 may be used. As shown, the LiDAR sensors 120 may be mounted to the structure 106 so as to emit the signals 122 in front of the compartments 108. In some instances, the LiDAR sensors 120 may be integrated with the horizontal members 300 and/or the vertical members 302, or may couple to the horizontal members 300 and/or the vertical members 302. Additionally, or alternatively, the LiDAR sensors 120 may mount to a bracket, bar, or other frame for positioning the LiDAR sensors 120 on, or relative to, of the frame of the structure 106. In this manner, the LiDAR sensors 120 may be affixed to the structure 106.

In some instances, the LiDAR sensors 120, the lighting elements 118, and/or the compartments 108 may be movable. For example, movable storage racks or storage carts may be moved into the sortation area 104, where the moveable storage racks may include or define the compartments 108. Here, the LiDAR sensors 120 and/or the lighting elements 118 may be disposed on a frame or structure of the moveable storage rack. The process for detecting the sortation of the packages 102 may be similar. Additionally, in instances where the LiDAR sensors 120 and/or the lighting elements 118 are disposed on the movable storage racks, the LiDAR sensors 120 may be controlled, either wirelessly or wired, via the control system 116. For example, connectors may communicatively couple the LiDAR sensors 120 and the light elements to or with the control system 116.

Figure 4:
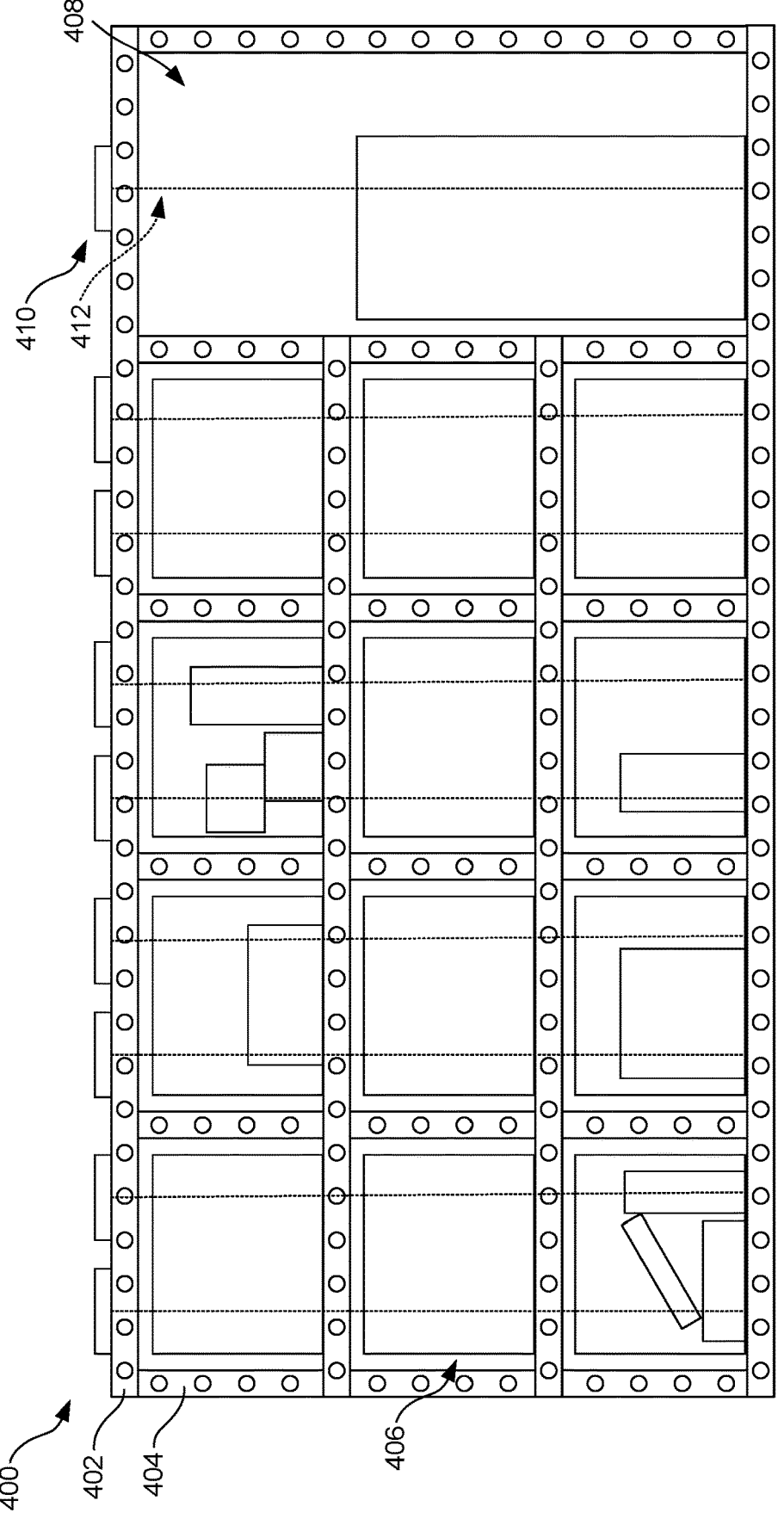
FIG. 4 illustrates an alternative example structure within the sortation area of FIG. 1 that includes compartments, according to an embodiment of the present disclosure.

FIG. 4 illustrates an alternative structure 400. In some respects, the structure 400 may be similar to the structure 106 as discussed above in FIGS. 1-3. For example, the structure 400 may include horizontal members 402 and vertical members 404 that form compartments 406 of the structure 400. However, in FIG. 4, the structure 400 is shown including an oversized compartment 408. The oversized compartment 408 may receive packages 102 that do not fit within the compartments 406. For example, the packages 102 within the oversized compartment 408 may include a length, depth, or width that is too large for the compartments 406. The size and shape of the oversized compartment 408, however, is merely illustrative and it is to be understood that structures may include a different layout of compartments, whether in size, shape, and/or number.

LiDAR sensors 410, which output signals 412, are shown arranged to detect locations of the packages 102 being placed within the structure 400. In some instances, the oversized compartment 408 may include a lesser number of LiDAR sensors 410 as compared to other portions of the structure 400. For example, a single LiDAR sensor 410 is shown arranged to monitor the oversized compartment 408. In some instances, the single LiDAR sensor 410 is included given the size of the packages 102 placed within the oversized compartment 408. That is, two LiDAR sensors 410 may not be needed to detect instances of when the packages 102 are placed in the oversized compartment 408 given the size of the packages 102. Comparatively, the other compartments 406 of the structure 400 may sort and receive smaller packages, and may have an increased number of LiDAR sensors 410 in order to detect when the packages 102 are placed therein.

In some instances, because of the size of the packages 102 placed within the oversized compartment 408, some of the packages 102 in the oversized compartment 408 may extend beyond the front of the structure 400 and impede the signals 412. However, because there are no compartments located vertically beneath the oversized compartment 408, the packages 102 that extend beyond the front and impede the signals 412 may not affect an ability of the LiDAR sensors 410 to determine when packages are sorted in the oversized compartment 408. That is, because the packages 102 in the oversized compartment 408 may be stacked on top of one another, or placed beside one another, the LiDAR sensors 410 may be able to detect impedances that are above other packages 102 for determining whether additional packages 102 were sorted and placed in the oversized compartment 408. This is in comparison to the compartments 406, whereby if a package within one compartment 406 extends over the front, the package impedes the ability of the LiDAR sensors 410 to detect whether a package was properly placed in a compartment 406 below the compartment in which the package extends over the front.

Figure 5:
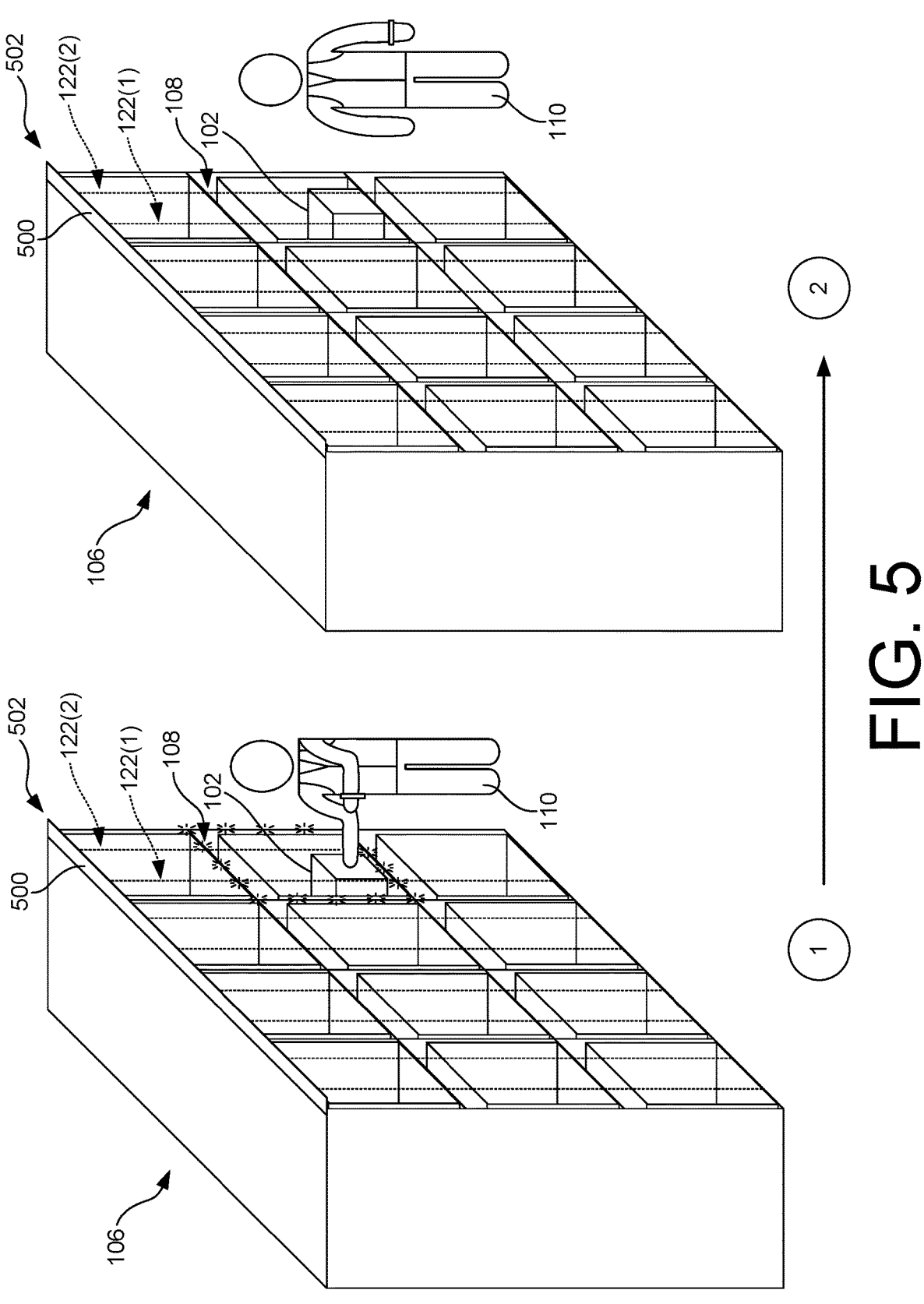
FIG. 5 illustrates a scenario of an associate correctly sorting a package within the sortation area of FIG. 1, according to an embodiment of the present disclosure.

FIG. 5 illustrates an example scenario of the associate 110 sorting a package 102 within the structure 106 of the sortation area 104. At "1," the associate 110 is shown placing the package 102 within a given compartment 108. This compartment 108 may be predetermined by the control system 116 as being associated with the destination location, for example, based on the shipping address of the package 102. To indicate the compartment 108, the control system 116 may cause the lighting elements 118 surrounding the compartment 108 to activate (e.g., illuminate). In some instances, the lighting elements 118 may be activated to a first state (e.g., first color, first frequency of blinking, first brightness, first pattern, etc.). The visual cue provided by the lighting elements 118 assists the associate 110 in traveling to the compartment 108 for sorting the package 102.

As further shown at "1," the LiDAR sensors 120 emit the signals 122, such as the first signal 122(1) and the second signal 122(2), respectively. In some instances, the LiDAR sensors 120 couple to or are disposed on a bar 500. The bar 500 may couple to the structure 106 (e.g., the horizontal members 300 and/or the vertical members 302). The LiDAR sensors 120 are arranged to output the signals 122 over a front 502 of the structure 106. In doing so, the LiDAR sensors 120 may detect instances of when the associate 110 places the packages 102 within the compartments 108. For example, as shown at "1," the right arm of the associate 110 is shown impeding the second signal 122(2). Light reflected off the associate 110, given the impedance, is sensed by the LiDAR sensor 120 (e.g., the second LiDAR sensor 120(2)). Light may also be reflected off the package 102 while the associate 110 is placing the package 102 in the compartment 108. The received signal is indicative of a distance between the LiDAR sensor 120 and the impedance, and using this distance, the control system 116 is able to determine a location associated with the impedance.

The location of the impedance is compared against the range of positions associated with the compartments 108, respectively, to determine whether the package 102 was placed in the proper compartment 108. Meanwhile, the package 102 and/or the associate 110 may not impede the first signal 122(1). As such, in this instance, the package 102 may be small enough, such that when placed within the compartment 108, only a single LiDAR signal is impeded. However, more than two LiDAR sensors 120 may be used to increase a granularity of detecting the packages 102 placed in the compartments 108.

After placing the package 102 in the compartment 108, the associate 110 may withdraw their arms so as to not impede the LiDAR signals 122. Therein, and as shown at "2," the second signal 122(2), for example, may not be impeded and extend to the ground surface. The associate 110 may then retrieve another package 102 for further sortation within the structure 106 (or addition structures). Additionally, at "2" the package 102 is shown fully residing within the compartment 108 so as to not impede the LiDAR signals 122. As such, packages 102 that are sorted vertically below the compartment 108 may be detected by the LiDAR sensors 120.

As also illustrated at "2," after placing the package 102 in the compartment 108, the lighting elements 118 may be activated to a second state (e.g., second color, second frequency of blinking, second brightness, second pattern, etc.). In some instances, the second state may include turning off the lighting elements 118, or dimming the lighting elements 118. In some instances, the second state may include a different color than the first state to visually indicate to the associate 110 that the package 102 was correctly sorted. For example, the first state may include blue light, while the second state may include green light.

Figure 6:
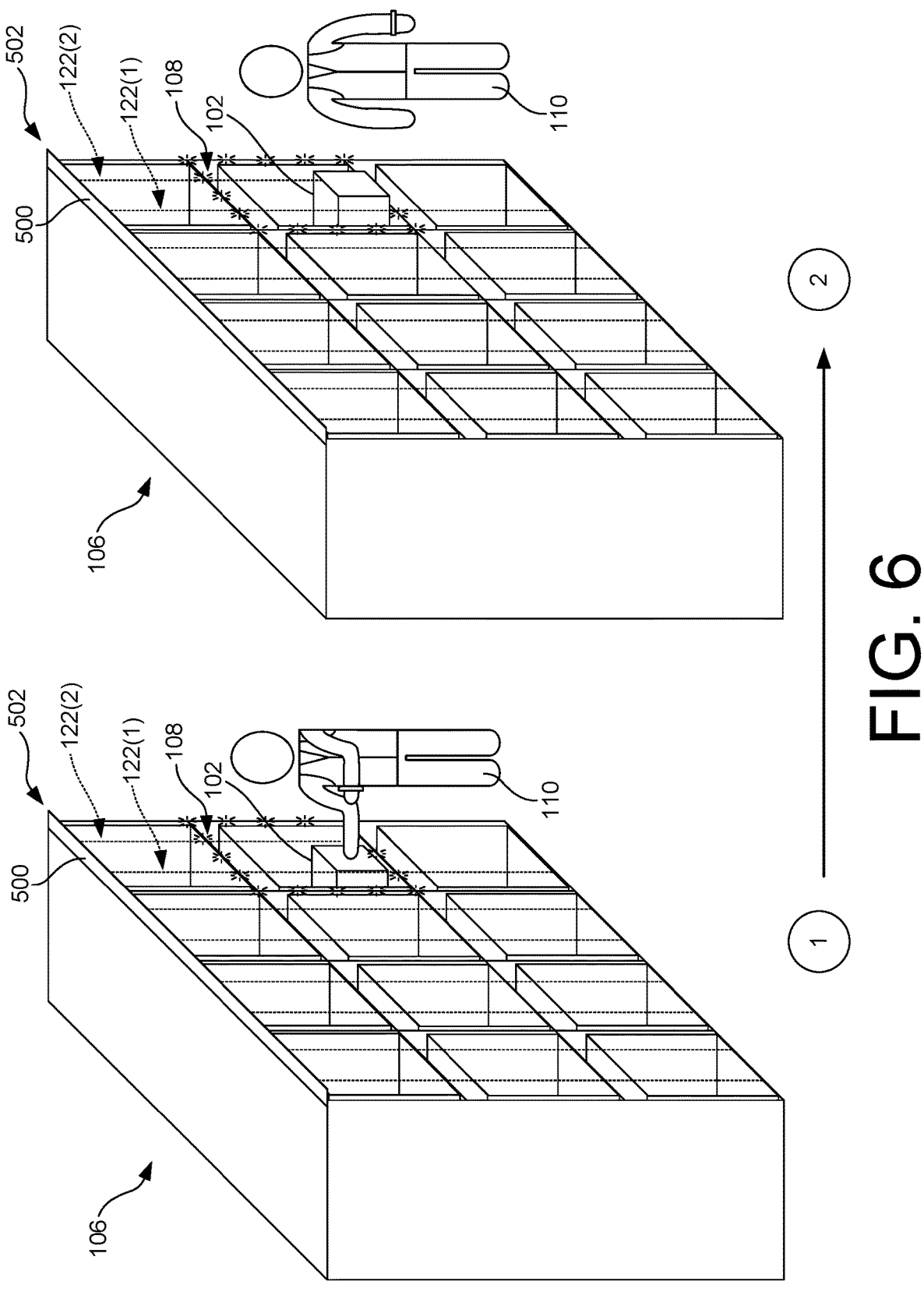
FIG. 6 illustrates a scenario of an associate correctly sorting a package within the sortation area of FIG. 1, but the package extends beyond the compartment, according to an embodiment of the present disclosure.

FIG. 6 illustrates an example scenario of the associate 110 sorting a package 102 within the structure 106 of the sortation area 104. The scenario in FIG. 6 may be similar to the scenario discussed above in FIG. 5. For example, at "1," the associate 110 may place the package 102 within a given compartment 108 in the structure 106. This compartment 108 may be determined by the control system 116. To indicate the compartment 108, the control system 116 may cause the lighting elements 118 surrounding the compartment 108 to activate (e.g., illuminate). In some instances, at "1" the lighting elements 118 may be activated to a first state (e.g., first color, first frequency of blinking, first brightness, etc.). Additionally, the LiDAR sensors 120 emit the signals 122, such as the first signal 122(1) and the second signal 122(2), respectively. As noted above, the LiDAR sensors 120 are arranged to output the signals 122 over the front 502 of the structure 106 (e.g., via the bar 500), such that the LiDAR sensors 120 may detect instances of when the associate 110 places the packages 102 within the compartments 108. As shown at "1," the right arm of the associate 110 impedes the second signal 122(2). Light reflected off the associate 110, given the impedance, is sensed by the LiDAR sensor 120 (e.g., the second LiDAR sensor 120(2)).

After placing the package 102 in the compartment 108, the associate 110 may withdraw their arms so as to not impede the LiDAR signals 122. However, as shown at "2," the package 102 may extend beyond the front 502 and continue to impede the second signal 122(2). In some instances, the determination that the package 102 is extended beyond the front 502, or otherwise impeding the second signal 122(2), may be based on detecting the impedance for a threshold amount of time (e.g., three seconds, five seconds, etc.). As such, the control system 116 may determine those instances that represent impedances when the associate 110 places the package 102 in the compartment 108, and those instances that represent impedances when the package 102 extends beyond the front 502 and interferes with the LiDAR signals 122.

As shown at "2," because the package 102 extends beyond the front 502, the lighting elements 118 may be activated to a second state (e.g., second color, second frequency of blinking, second brightness, etc.) that is different than the first state. In some instances, the second state may include a different color than the first state to visually indicate to the associate 110 that the package 102 was incorrectly sorted or is otherwise extending beyond the front 502 and interfering with the LiDAR signal(s) 122. For example, the first state may include blue light, while the second state may include red light. The control system 116 may determine the location of the impedance, and which lighting elements 118 to illuminate, based on comparing the location to the range of positions associated with the compartments 108. Using this visual cue, the associate 110 may reorganize the package 102 within the compartment 108 such the package 102 does not interfere or otherwise impede the LiDAR signals 122. Once the package 102 is readjusted, so as to not interfere with the LiDAR signals 122, the lighting elements 118 may deactivate.

In some instances, where the package 102 extends beyond the front 502, the associate 110 may be prohibited from sorting further packages 102. For example, the associate 110 may not be permitted to scan a second package for sorting within the structure 106. Such control may come by way of the control system 116 restricting the device 114 from scanning another package 102. That is, because the package 102 interferes with the second signal 122(2), the LiDAR sensors 120 may be unable to detect a second package being placed in a compartment below the compartment 108. This, in turn, restricts the control system 116 from, knowing whether or not packages 102 were correctly sorted. However, as noted above, in instances where the compartment 108 represents an oversized compartment, such overhanging of the packages may be ignored.

In some instances, the associate 110 may be permitted to scan additional packages 102 even though some of the LiDAR signals 122 are impeded. For example, using the illustration shown in FIG. 6, in which the package 102 is sorted within the fourth column, the associate 110 may be permitted to sort another package within the additional columns. Here, the associate 110 may scan another package 102 with the device 114 even though the package 102 extends beyond the compartment 108 and impedes the second signal 122(2). If the other package 102 is to be sorted in a column other than the fourth column, the lighting elements 118 of the appropriate compartment 108 may be illuminated. Since those LiDAR signals 122 are not impeded with, the LiDAR sensors 120 within those columns are still permitted to detect the placement of the packages 102. If, however, the other package 102 is to be sorted in the fourth column, the associated compartment in which the other package 102 is to be placed may not be illuminated. Instead, the compartment 108 with the overhanging package 102 may indicate that the package 102 needs to be reorganized in the compartment 108 (e.g., blinking red). Once the associate 110 resolves that issue, the associate 110 is permitted to further sort the other package 102 in the fourth column. For example, lighting elements 118 around a corresponding compartment for the other package 102 may be illuminated.

Figure 7:
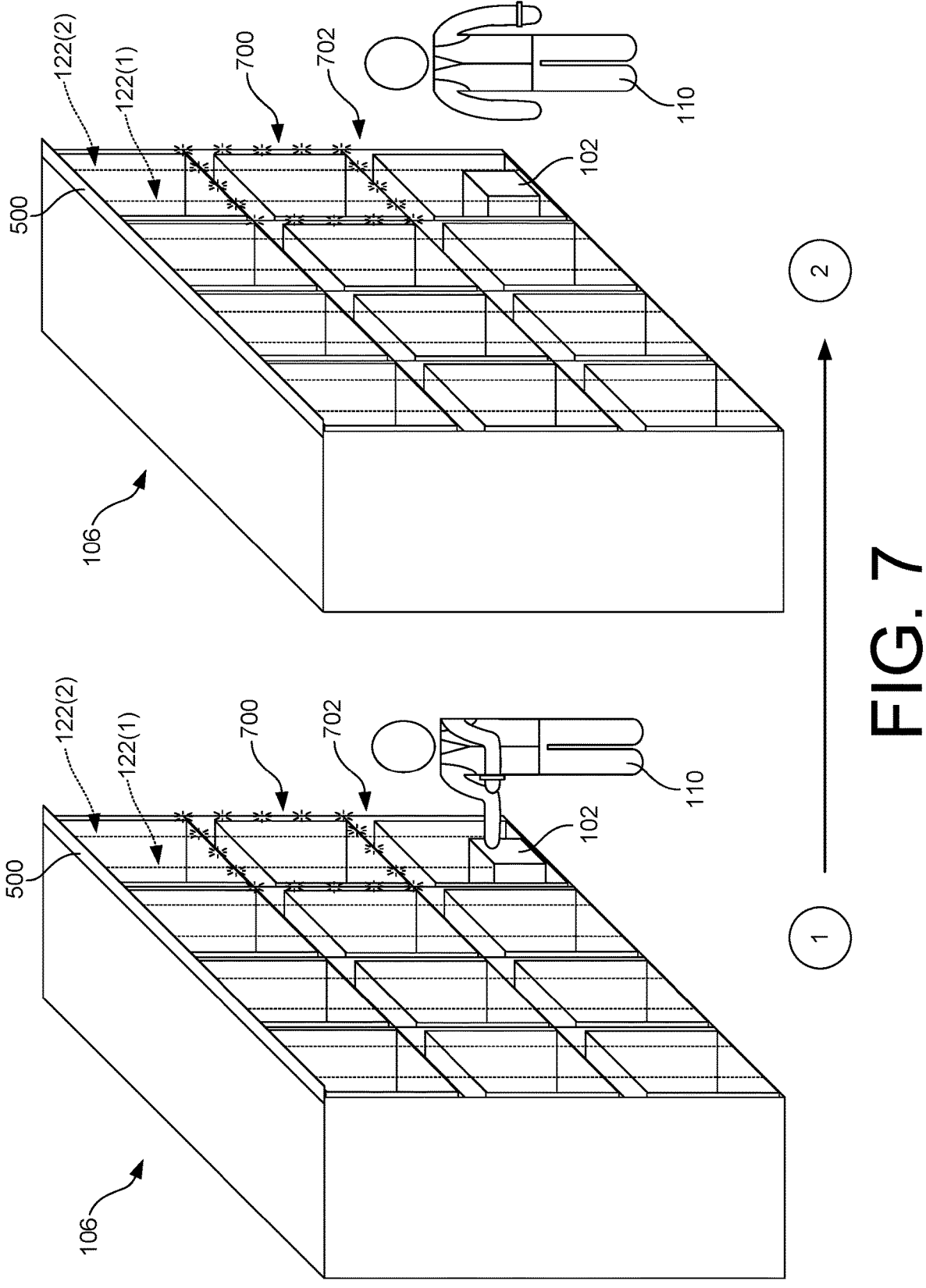
FIG. 7 illustrates a scenario of an associate incorrectly sorting a package within the sortation area of FIG. 1, according to an embodiment of the present disclosure.

FIG. 7 illustrates an example scenario of the associate 110 sorting a package 102 within the structure 106 of the sortation area 104. At "1," lighting elements 118 around a first compartment 700 may be illuminated. The first compartment 700 may be determined by the control system 116 as being associated with the destination location of the package 102, for example, based on the shipping address of the package 102. To indicate the first compartment 700, the control system 116 may cause the lighting elements 118 surrounding the first compartment 700 to activate (e.g., illuminate). In some instances, the lighting elements 118 may be activated to a first state (e.g., first color, first frequency of blinking, first brightness, etc.). The visual cue provided by the lighting elements 118 assist the associate 110 in traveling to the first compartment 700 for sorting the package 102.

However, at "1" the associate 110 is shown placing the package 102 in an incorrect compartment, such as a second compartment 702 that is vertically below the first compartment 108. To detect the location at which the associate 110 places the package 102, the LiDAR sensors 120 emit the signals 122, such as the first signal 122(1) and the second signal 122(2), respectively. For example, as shown at "1," the right arm of the associate 110 is shown impeding the second signal 122(2) and/or the package 102 may impede the first signal 122(1). Light reflected off the associate 110, and/or the package 102 given the impedance, is sensed by the LiDAR sensors 120. The received signal(s) is/are indicative of a distance between the LiDAR sensors 120 and the impedance, and using this distance, the control system 116 is able to determine a location associated with the impedance.

The location of the impedance is compared against the range of positions associated with the compartments 108 on the structure 106, respectively, to determine whether the package 102 was placed in the proper compartment 108. For example, at "1" the impedance may be detected, the location of the impedance may be determined, and this location may be compared against the range of positions associated with the compartments 108. This comparison results in a determination that the impedance was at a location associated with the second compartment 702. Here, the control system 116, for example, may determine that the package 102 was improperly sorted. That is, because the package 102 was not sorted in the first compartment 700, which is the correct compartment, the control system 116 determines that the package 102 was improperly sorted.

As a result, at "2" the lighting elements 118 may illuminate to a second state (e.g., second color, second frequency of blinking, second brightness, etc.). The second state may be indicative of the incorrect placement of the package 102 in the second compartment 702. However, the lighting elements 118 around the first compartment 700 are illuminated to the second state to indicate that the package 102 still needs to be sorted in the first compartment 700. The lighting elements 118 remain illuminated until the LiDAR sensors 120 detect, and the control system 116 determines, that the package 102 was placed in the first compartment 700. In such instances, the associate 110 may be prohibited from scanning other packages until the package 102 has been correctly sorted in the first compartment 700.

FIGS. 8 and 9 illustrate various processes related to sorting packages 102. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7, although the processes may be implemented in a wide variety of other environments, architectures and systems.

FIG. 8 illustrates an example process 800 for sorting packages 102 within the sortation area 104. In some instances, the process 800 may be performed, or carried out by, the control system 116 (or components thereof).

At 802, the process 800 may include receiving first data associated with a first package being scanned. For example, the control system 116 may receive, from the device 114, first data that is associated with scanning the package 102 (e.g., the scan data 206). The first data may be generated by the scanner 204 of the device 114 that scanned a barcode, label, or other identifier of the package 102. At the sortation area 104, the packages 102 may arrive by conveyor(s), pallets, gaylords, and so forth. Regardless, at the sortation area 104, the associate 110 may sort the packages 102 to their final destination, an intermediate location, or for further processing.

At 804, the process 800 may include determining, based at least in part on the first data, a compartment within the sortation area associated with sorting the first package for shipment. For example, the control system 116 using the identifier, or the scan data 206, determines a sorting location of the package 102 within the sortation area 104. Here, the sortation area 104 may include a plurality of compartments 108, where each compartment 108 may be associated with a respective destination, address, locale, and so forth. By sorting the packages 102 in such manner, like packages 102 may be grouped together for shipment. In some instances, the control system 116 utilizes the sortation area data 224 and/or the compartment data 226 to determine the compartment 108 in which the package 102 is to be sorted.

At 806, the process 800 may include causing output of a first indication associated with placing the first package in the compartment. For example, the control system 116 may cause lighting elements 118 around the compartment 108 to illuminate. In some instances, the lighting elements 118 may be illuminated to first state, such as a first color, a first frequency, first brightness, and so forth. This first state of the lighting elements 118 may serve as an indication to the associate 110 as to the compartment 108 in which the package 102 is to be sorted. In some instances, the control system 116 utilizes the sortation area data 224 and/or the compartment data 226 to determine which lighting elements 118 to instruct or control for outputting the first indication. In this sense, the control system 116 is able to control certain lighting elements 118 that correspond to the compartment 108, as compared to other lighting elements 118 disposed around other compartments 108 in the sortation area 104.

At 808, the process 800 may include receiving, from one or more sensors, second data. For example, the control system 116 may receive the sensor data 228 from the LiDAR sensors 120, where the sensor data 228 is indicative of an impedance of the LiDAR signals 122 output by the LiDAR sensors 120. For example, when the associate 110 places the package 102 into a compartment 108 in the sortation area 104, the LiDAR sensors 120 detect the impedance, or interference of the LiDAR signals 122. In some instances, the LiDAR sensors 120 are arranged vertically above columns of the compartments 108, to detect such impedances. As such, using the sensor data 228, the control system 116 is able to determine the location of the impedance within the sortation area 104 and associate the impedance with a particular compartment 108.

At 810, the process 800 may include determining whether the second data is indicative of the first package being placed in the compartment. For example, as each column of the sortation area 104 may include respective LiDAR sensors 120, the control system 116 may analyze the sensor data 228 to determine where (if any) the impedances of the LiDAR signals 122 were sensed. The sensor data 228 therefore indicates a location of the impedance within the sortation area 104. This location is compared against a range of positions associated with compartments 108 on the sortation area 104, or within the columns. For example, once the location of the impedance is known, this location may be compared against the range of positions associated with the compartments 108, vice versa. This comparison may indicate which compartment the package 102 was placed. That is, by associating the impedance with a particular compartment 108, the control system 116 is able to determine whether the package 102 was placed in the correct compartment 108. In this manner, the LiDAR sensors 120 may be used as a way to track the sortation of the packages 102 within the sortation area 104, as well as determining whether the packages 102 were correctly sorted within the sortation area 104.

If at 810 the process 800 determines that the package 102 was not placed in the compartment 108, the process 800 may follow the "NO" route and proceed to 812. For example, the sensor data 228 may be indicative of the first package 102 being placed in another compartment that does not correspond to the compartment 108 for sorting the package 102. At 812, the process 800 may include causing output of a second indication associated with placing the first package in the compartment 108. For example, the control system 116 may cause the lighting elements 118 around the compartment 108 to illuminate. In some instances, the lighting elements 118 may be illuminated to a second state that is/are different than the first state. For example, the second state may be associated with the lighting elements 118 illuminating red to indicate the improper placement of the package 102 in the wrong compartment 108.

From 812, the process 800 may loop to 808 whereby the process 800 may continue to receive data from the one or more sensors. In this manner, the control system 116 determines whether the package 102 is placed in the compartment 108. However, the lighting elements 118 around the compartment 108 are illuminated to the second state to indicate that the package 102 still needs to be sorted correctly. The lighting elements 118 remain illuminated until the LiDAR sensors 120 detect, and the control system 116 determines, that the package 102 was placed in the compartment 108. In such instances, the associate 110 may be prohibited from scanning other packages until the package 102 has been correctly sorted in the compartment 108.

If at 810 the process 800 determines that the second data is indicative of the first package being placed in the compartment, the process 800 may follow the "YES" route and proceed to 814. At 814, the process 800 may include causing output of the first indication to terminate. For example, in instances where the package 102 is properly sorted within the sortation area 104, the control system 116 deactivates (e.g., deluminates) the lighting elements 118. In other instances, however, the lighting elements 118 may output a third indication and change state to indicate that the first package 102 was properly sorted (e.g., green). By terminating output of the first indication, the control system 116 may control other lighting elements 118 within the sortation area 104 for instructing the associate 110 as to further compartments 108 for sorting other packages 102.

At 816, the process 800 may include receiving third data associated with a second package being scanned. For example, the control system 116 may receive, from the device 114, third data that is associated with scanning the second package 102. The third data may be generated by the scanner 204 of the device 114 that scanned a barcode, label, or other identifier of the second package 102. From 816, the process 800 may loop to 804 whereby the control system 116 may instruct lighting elements 118 to illuminate to instruct the associate 110 as to the compartment 108 for sorting the second package 102. Therein, the control system 116 may utilize sensor data 228 generated by the LiDAR sensors 120 to determine whether the second package 102 was correctly sorted. As such, in instances where the associate 110 correctly sorts the first package 102, following the "YES" route from 810, the associate 110 is permitted to scan additional packages and sort the additional packages.

The process 800 illustrates communicatively coupling with a single device 114 for receiving the first data (as well as the third data) associated with the packages 102 being scanned. However, the control system 116 may receive the scan data 206 from a plurality of devices 114 arranged about the environment 100. In such instances, the control system 116 may respectively control lighting elements 118 across a plurality of sortation areas 104 for instructing the associates 110, respectively, as to the proper compartment 108 in which to sort the packages 102.

Furthermore, in some instances, the control system 116 may receive the scan data 206 from multiple devices 114 within a single sortation area 104. For example, two associates 110 operating respective devices 114 may be sorting packages 102. To respectively instruct the associates 110 as to the sorting locations, each associate 110 may have color coordinated indications 220 that designate the compartments. For example, after a first associate scans a first package, a first compartment in which the first package is to be sorted may be illuminated in blue. If a second associate scans a second package, a second compartment in which the second package is to be sorted may be illuminated in green. In doing so, the first associate and the second associate may travel to their respective compartments for sorting the packages. Here, the LiDAR sensors 120 may monitor such sortation to determine that the packages 102 were placed in the correct compartments. GPS or other location based sensors may be used to determine the location of the devices 114 and which sortation area 104 the associates 110 are located.

FIG. 9 illustrates an example process 900 for sorting packages within the sortation area 104. In some instances, the process 900 may be performed, or carried out by, the control system 116 (or components thereof).

At 902, the process 900 may include receiving first data associated with a package being scanned. For example, the control system 116 may receive, from the device 114, first data that is associated with scanning the package 102 (e.g., the scan data 206). The first data may be generated by the scanner 204 of the device 114 that scanned a barcode, label, or other identifier of the package 102. At the sortation area 104, the packages 102 may arrive by conveyor(s), pallets, gaylords, and so forth. Regardless, at the sortation area 104, the associate 110 may sort the packages 102 to their final destination, an intermediate location, or for further processing.

At 904, the process 900 may include determining, based at least in part on the first data, a compartment associated with sorting the package for shipment. For example, the control system 116 using the identifier, or the scan data 206, determines a sorting location of the package 102 within the sortation area 104. Here, the sortation area 104 may include a plurality of compartments 108, where each compartment 108 may be associated with a respective destination, address, locale, and so forth. By sorting the packages 102 in such manner, like packages 102 may be grouped together for shipment. In some instances, the control system 116 utilizes the sortation area data 224 and/or the compartment data 226 to determine the compartment 108 in which the package 102 is to be sorted.

At 906, the process 900 may include causing the lighting elements associated with the compartment to illuminate to a first state. For example, the control system 116 may cause lighting elements 118 around the compartment 108 to illuminate. In some instances, the lighting elements 118 may be illuminated to a first color, a first frequency, first brightness, and so forth. This first state of the lighting elements 118 may serve as an indication to the associate 110 as to the compartment 108 in which the package 102 is to be sorted. In some instances, the control system 116 utilizes the sortation area data 224 and/or the compartment data 226 to determine which lighting elements 118 to instruct or control. The control system 116 is therefore able to control certain lighting elements 118 that correspond to the compartment 108, as compared to other lighting elements 118 disposed around other compartments 108 in the sortation area 104.

At 908, the process 900 may include receiving, from one or more sensors, second data. For example, the control system 116 may receive the sensor data 228 from the LiDAR sensors 120, where the sensor data 228 is indicative of an impedance of the LiDAR signals 122 output by the LiDAR sensors 120. For example, when the associate 110 places the package 102 into a compartment 108 in the sortation area 104, the LiDAR sensors 120 detect the impedance, or interference, of the LiDAR signals 122. In some instances, the LiDAR sensors 120 are arranged vertically above columns of the compartments 108 to detect such impedances.

At 910, the process 900 may include determining, based at least in part on the second data, a location associated with the package being sorted. For example, as each column of the sortation area 104 may include respective LiDAR sensors 120, the control system 116 may analyze the sensor data 228 to determine where (if any) the impedances of the LiDAR signals 122 were sensed. The sensor data 228 indicates a location of the impedance within the sortation area 104, or a distance from the LiDAR sensors 120. In other words, the control system 116 determines a location, within the sortation area 104, corresponding to the impedance.

At 912, the process 900 determines whether the location corresponds to the compartment. For example, the location from 910 is compared against a range of positions associated with the compartments 108 on the sortation area 104, or within the columns. That is, once the location of the impedance is known, this location may be compared against the range of positions associated with the compartments 108. This comparison may indicate which of the compartments the package 102 was placed. That is, by associating the impedance with a particular compartment 108, the control system 116 is able to determine whether the package 102 was placed in the correct compartment 108. The LiDAR sensors 120 are therefore used as a way to track the sortation of the packages 102 within the sortation area 104, as well as determine whether the packages 102 were correctly sorted within the sortation area 104.

If at 912 the process 900 determines that the package 102 was placed in the compartment 108, the process 900 may follow the "YES" route and proceed to 914. At 914, the process 900 may include determining whether an obstruction is detected for greater than a threshold time. For example, after placing the package 102 in the compartment 108, the package 102 may overhang from the compartment 108 and obstruct the one or more of the LiDAR signals 122. To make this determination, the control system 116 may continue to receive sensor data 228 for determining whether an object (e.g., the associate 110, the package 102, etc.) is detected. If the object is detected for the threshold time, this may be indicative of the package 102 extending beyond the compartment 108, as compared to the associate 110 placing the package 102 in the compartment 108. That is, if the impedance is continued to be detected, the control system 116 may determine that this impedance corresponds to the package 102 extending beyond the compartment 108. This threshold of time, for example, may be greater than an amount of time associated with the associate 110 placing the package 102 in the compartment 108.

If at 914, the process 900 determines that there are no obstructions, or that the obstruction was not detected for the threshold time, the process 900 may follow the "NO" route and proceed to 916. At 916, the process 900 may include causing the lighting elements associated with the compartment to deluminate. For example, in instances where the package 102 is properly sorted within the sortation area 104 and there are no obstructions, the control system 116 deluminates (e.g., deactivates) the lighting elements 118. In other instances, however, the lighting elements 118 may change state to indicate that the package 102 was properly sorted (e.g., green). By turning off the lighting elements in a pattern, for example, the control system 116 may control other lighting elements 118 within the sortation area 104 for instructing the associate as to further compartments 108 for sorting other packages 102.

If at 912 the process 900 determines that the location of the impedance does not correspond to the compartment, the process 900 may follow the "NO" route and proceed to 918. For example, the sensor data 228 may be indicative of the package 102 being placed in another compartment that does not correspond to the compartment 108 for sorting the package 102. At 918, the process 900 may include causing the lighting elements associated with the compartment to illuminate to a second state. In some instances, the second state may be different than the first state. For example, the second state may be associated with the lighting elements 118 illuminating red to indicate the improper placement of the package 102 in the wrong compartment 108. The process 900 may proceed to 918 following the "YES" route from 914 in which obstructions were detected, and/or the obstructions were detected for the threshold time.

At 920, the process 900 may include receiving third data from the one or more sensors. For example, the control system 116 may receive sensor data 228 from the LiDAR sensors 120 for determining whether the package 102 was placed in the compartment 108. That is, from 920, the process 900 may loop to 912. However, the lighting elements 118 around the compartment 108 are illuminated to the second state to indicate that the package 102 still needs to be sorted correctly. The lighting elements 118 remain illuminated until the LiDAR sensors 120 detect, and the control system 116 determines, that the package 102 was placed in the compartment 108 or until the obstructions are cleared. In such instances, the associate 110 may be prohibited from scanning other packages until the package 102 has been correctly sorted in the compartment 108.

Accordingly, the process 900 illustrates that the control system 116 functions to utilize the LiDAR sensors 120 to determine when packages 102 are placed within the compartments 108, when obstructions are present, and when the obstructions become clear. The automated detection of the sortation by the LiDAR sensors 120 may eliminate the need for the associate scanning the compartment 108 or otherwise indicating that the package 102 was sorted into the compartment 108.

Figure 10:
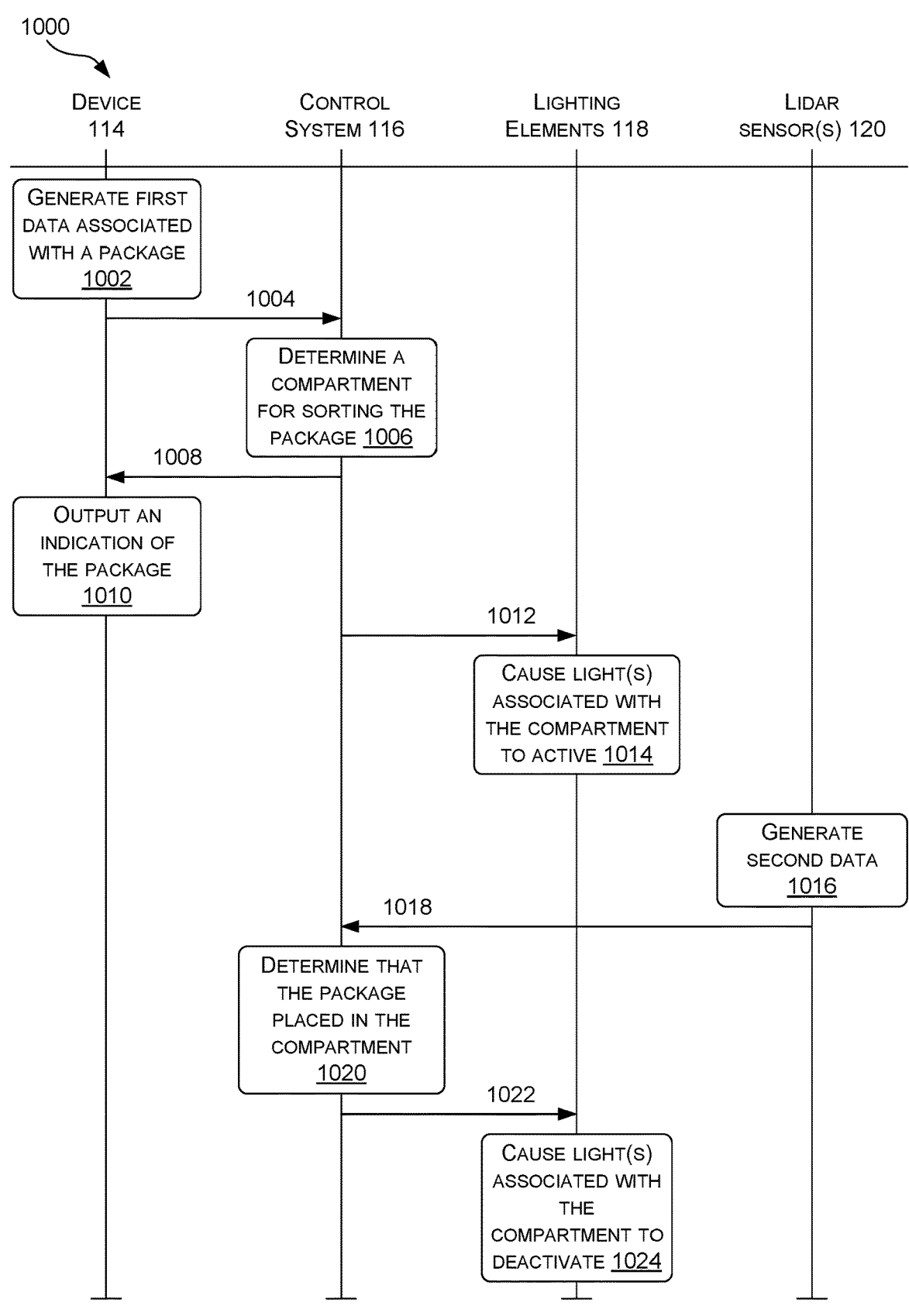
FIG. 10 illustrates an example signal diagram for determining whether packages are correctly sorted, according to an embodiment of the present disclosure.

FIG. 10 illustrates an example signal diagram 1000 showing communications between the device 114, the control system 116, and how the control system 116 controls the lighting elements 118 and receives the sensor data 228 from the LiDAR sensors 120.

At 1002, the device 114 may generate first data associated with a package. For example, the scanner 204 of the device 114 may scan an identifier of the package 102 (e.g., barcode). The device 114 may therein generate the scan data 206 that is associated with, or identifies, the barcode.

The device 114 may transmit a signal 1004 to the control system 116. The signal 1004 is associated with the scan data 206 generated by the device 114. The signal 1004 is sent to the control system 116 for use in analyzing the identifier of the package 102 and determining how to sort the package 102.

At 1006, the device 114 may determine a compartment for sorting the package 102. For example, the control system 116 using the scan data 206, determines a sorting location of the package 102 within the sortation area 104. Here, the sortation area 104 may include a plurality of compartments 108, where each compartment 108 may be associated with a respective destination, address, locale, and so forth. By sorting the packages 102 in such manner, like packages 102 may be grouped together for shipment. In some instances, the control system 116 utilizes the sortation area data 224 and/or the compartment data 226 to determine the compartment 108 in which the package 102 is to be sorted.

The control system 116 may transmit a signal 1008 to the device 114. In some instances, the signal 1008 indicates the compartment 108 in the sortation area 104 associated with sorting the package 102. At 1010, responsive to receiving the signal 1008, the display 208 of the device 114 may output an indication of the compartment 108 on the display 208. In some instances, the device 114 may also output identifying information of the package 102 on the display 208, such as shipping address, recipient, and so forth (e.g., the package data 232).

The control system 116 also transmits a signal 1012 to lighting elements. The signal 1012 identifies, is sent to, or causes those lighting elements 118 associated with the compartment 108 to activate. For example, at 1014, the lighting elements 118 are caused to illuminate. For example, the control system 116 may cause lighting elements 118 around the compartment 108 to illuminate. In some instances, the lighting elements 118 may be illuminated to a particular color to serve as an indication to the associate 110 as to the compartment 108 in which the package 102 is to be sorted. In some instances, the control system 116 utilizes the sortation area data 224 and/or the compartment data 226 to determine which lighting elements 118 to instruct or control. For example, the control system 116 may know which of the lighting elements to activate for illuminating a portion, area, or boundary around the compartment 108.

At 1016, the LiDAR sensors 120 generate second data. For example, when the associate 110 places the package 102 into a compartment in the sortation area 104, the LiDAR sensors 120 detect the impedance, or interference, of the LiDAR signals 122. In response the LiDAR sensors 120 may generate the second data (e.g., the sensor data 228). The LiDAR sensors 120 then transmit a signal 1018 to the control system 116. For example, the control system 116 may receive the sensor data 228 from the LiDAR sensors 120, where the sensor data 228 is indicative of an impedance of the LiDAR signals 122 output by the LiDAR sensors 120.

The control system 116 determines at 1020 that the package was placed in the compartment 108. For example, the control system 116 may determine the location of the impedance and compare the impedance against a range of positions associated with the compartment 108 in the sortation area 104, or within the columns. This comparison may indicate which of the compartments that the package 102 was placed. That is, by associating the impedance with a particular compartment 108, the control system 116 is able to determine whether the package 102 was placed in the correct compartment 108. The LiDAR sensors 120 are therefore used as a way to track the sortation of the packages 102 within the sortation area 104, as well as determining whether the packages 102 were correctly sorted within the sortation area 104. The control system 116 is shown determining that the package 102 was placed in the correct compartment 108, however, in other instances, the control system 116 may determine that the package 102 was placed in the incorrect compartment 108.

Responsive to determining that the package 102 was placed in the compartment 108, the control system 116 transmits a signal 1022 to the lighting elements 118. The signal 1022 may represent an instruction to deactivate the lighting elements (e.g., turn off). For example, at 1024, the signal 1022 may cause the lighting elements associated with the compartment to deactivate. For example, in instances where the package 102 is properly sorted, the control system 116 causes the lighting elements 118 to turn off. In some instances, however, the lighting elements 118 may illuminate to a second state to indicate that the package 102 was properly stored.

Additionally, in some instances, following the determination that the package 102 was placed in the compartment 108, the control system 116 may transmit an acknowledge or confirmation to the device 114. The confirmation may cause the device 114 to display an indication that the package 102 was correctly placed in the compartment 108. Additionally, in response to receive the confirmation, the device may be permitted to scan another package 102. That is, once the package 102 is correctly sorted into the compartment 108, the device 114 may be permitted to scan another package 102 for further sortation within the sortation area 104.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processors to perform acts comprising:
    receiving first data from a device, the first data associated with a package in an environment being scanned;
    determining, based on the first data, a compartment within a sortation area of the environment associated with sorting the package, the sortation area including a plurality of compartments arranged in columns, the compartment being within a first column of the columns;
    causing lighting elements at least partially disposed around the compartment to activate to a first lighting state;
    receiving second data from one or more LiDAR sensors, the one or more LiDAR sensors being arranged to detect interferences in the first column;
    determining, based on the second data, a vertical position within the first column associated with an interference;
    determining a range of positions within the first column that correspond to the compartment;
    determining that the vertical position is within the range of positions associated with the compartment; and
    causing, based on the position being within the range of positions, the lighting elements at least partially disposed around the compartment to activate to a second lighting state that is different than the first lighting state.

2. The system of claim 1, wherein:
causing the lighting elements to activate to the first lighting state comprises at least one of:
    causing the lighting elements to illuminate to a first color,
    causing the lighting elements to illuminate to a first luminosity, or
    causing the lighting elements to turn on and off according to a first pattern; and
causing the lighting elements to activate to the second lighting state comprises at least one of:
    causing the lighting elements to illuminate to a second color that is different than the first color,
    causing the lighting elements to illuminate to a second luminosity that is different than the first luminosity, or
    causing the lighting elements to turn on and off according to a second pattern that is different than the first pattern.

3. The system of claim 1, the acts further comprising:
receiving third data from the device, the third data associated with a second package in the environment being scanned;
determining, based on the third data, a second compartment within the sortation area, the second compartment being within a second column of the columns;
causing second lighting elements at least partially disposed around the second compartment to activate to the first lighting state;

receiving fourth data from one or more second LiDAR sensors, the one or more second LiDAR sensors being arranged to detect interferences in the second column;
determining, based on the fourth data, a second vertical position within the second column associated with a second interference;
determining a second range of positions within the second column that correspond to the second compartment;
determining that the second vertical position is outside the second range of positions associated with the second compartment; and
causing, based on the second vertical position being outside the second range of positions, the second lighting elements to activate to a third lighting state that is different than the second lighting state.

4. The system of claim 3, the acts further comprising:
based on determining that the vertical position is within the range of positions:
    deactivating the lighting elements at least partially disposed around the compartment, and
    permitting the device to scan the second package; and
based on the second vertical position being outside the second range of positions, prohibiting the device from scanning a third package.

5. A method comprising:
receiving first data associated with a package being scanned;
determining, based at least in part on the first data, a compartment within a sortation area associated with sorting the package for shipment;
causing one or more lighting elements at least partially disposed around the compartment to activate;
receiving, from one or more sensors, second data associated with the package being sorted within the sortation area, the one or more sensors being arranged to detect interferences within a column of the sortation area, the compartment being located in the column;
determining, based at least in part on the second data, a position within the sortation area at which the package was sorted; and
determining, based at least in part on the position, that the package was sorted into the compartment.

6. The method of claim 5, further comprising causing, based at least in part on determining that the package was sorted into the compartment, the one or more lighting elements to deactivate.

7. The method of claim 5, further comprising determining a range of positions, within the sortation area, that correspond to the compartment, and wherein determining that the package was sorted into the compartment comprises determining that the position is within the range of positions.

8. The method of claim 5, wherein:
the sortation area includes a plurality of compartments, individual compartments of the plurality of compartments being associated with a destination location;
the plurality of compartments are arranged in one or more rows and one or more columns; and
the compartment and at least a second compartment reside within the column of the one or more columns.

9. The method of claim 8, wherein the one or more sensors comprise one or more LiDAR sensors.

10. The method of claim 5, further comprising:
receiving third data associated with a second package being scanned;
determining, based at least in part on the third data, a second compartment within the sortation area associated with sorting the second package for shipment;

causing one or more second lighting elements at least partially disposed around the second compartment to activate;

receiving fourth data associated with the second package being sorted within the sortation area;

determining, based at least in part on the fourth data, a second position within the sortation area at which the second package was sorted; and determining, based at least in part on the second position, that the package was sorted into the second compartment.

11. The method of claim 5, further comprising:

receiving third data associated with a second package being scanned;

determining, based at least in part on the third data, a second compartment within the sortation area associated with sorting the second package for shipment;

causing one or more second lighting elements at least partially disposed around the second compartment to activate to a first state;

receiving fourth data associated with the second package being sorted within the sortation area;

determining, based at least in part on the fourth data, a second position within the sortation area at which the second package was sorted;

determining, based at least in part on the second position, that the package was sorted into a third compartment that is different than the second compartment; and causing the one or more second lighting elements at least partially disposed around the second compartment to activate to a second state that is different than the first state.

12. The method of claim 5, wherein causing the one or more lighting elements to activate comprises causing the one or more lighting elements to activate to a first state, further comprising:

receiving third data from the one or more sensors;

determining, based at least in part on the third data, that the package is extending beyond a boundary of the compartment; and causing, based at least in part on the package extending beyond the boundary of the compartment, the one or more lighting elements at least partially disposed around the compartment to activate to a second state that is different than the first state.

13. The method of claim 12, further comprising:

receiving fourth data from the one or more sensors;

determining, based at least in part on the fourth data, that the package is no longer extending beyond the boundary of the compartment; and causing, based at least in part on the package no longer extending beyond the boundary of the compartment, the one or more lighting elements at least partially disposed around the compartment to activate to a third state that is different than the second state.

14. The method of claim 5, wherein the first data is received from a device, further comprising, based at least in part on determining that the package was sorted into the compartment, permitting the device to scan a second package.

15. A method comprising:

determining a compartment within a sortation area associated with sorting a package for shipment;

causing one or more lighting elements associated with the compartment to activate to a first state;

receiving, from one or more LiDAR sensors arranged to monitor a column of compartments within the sortation area, data associated with the package being sorted;

determining, based at least in part on the data, a position within the sortation area corresponding to the package being sorted; and causing, based at least in part on the position, the one or more lighting elements associated with the compartment to activate to a second state that is different than the first state.

16. The method of claim 15, wherein:

causing the one or more lighting elements to activate to the first state comprises at least one of:

causing the one or more lighting elements to illuminate to a first color;

causing the one or more lighting elements to illuminate to a first luminosity, or causing the one or more lighting elements to turn on and off according to a first pattern; and causing the one or more lighting elements to activate to the second state comprises at least one of:

causing the one or more lighting elements to illuminate to a second color that is different than the first color, causing the one or more lighting elements to illuminate to a first luminosity that is different than the first luminosity, or causing the one or more lighting elements to turn on and off according to a second pattern that is different than the first pattern.

17. The method of claim 15, further comprising:

determining a range of positions, within the column, that correspond to the compartment;

determining that the position is within the range of positions; and determining, based at least in part on the position being with the range of positions, that the package was sorted into the compartment.

18. The method of claim 15, further comprising:

determining a range of positions, within the column, that correspond to the compartment;

determining that the position outside the range of positions; and determining, based at least in part on the position being outside the range of positions, that the package was sorted into a second compartment.

19. The method of claim 18, further comprising:

receiving, from the one or more LiDAR sensors or one or more second LiDAR sensors, second data associated with the package being sorted, the one or more second LiDAR sensors being arranged to monitor a second column of compartments within the sortation area;

determining, based at least in part on the second data, a second position within the sortation area corresponding to the package being sorted;

determining that the second position is within the range of positions; and determining, based at least in part on the second position being within the range of positions, that the package was sorted into the compartment.

20. The method of claim 15, further comprising:

receiving, from the one or more LiDAR sensors, second data associated with the package is extending beyond a boundary of the compartment; and receiving, from the one or more LiDAR sensors, third data associated with the package no longer extending beyond the boundary of the compartment, wherein causing the one or more lighting elements associated with the compartment to activate to the second state is based at least in part on the package no longer extending beyond the boundary of the compartment.

* * * * *